US011121557B2

(12) United States Patent
Cottrell et al.

(10) Patent No.: US 11,121,557 B2
(45) Date of Patent: Sep. 14, 2021

(54) POWER DISTRIBUTION SYSTEM FOR AIRCRAFT

(71) Applicant: Aurora Flight Sciences Corporation, Manassas, VA (US)

(72) Inventors: Daniel Cottrell, Manassas, VA (US); Garrett Hennig, Manassas, VA (US); Christopher Hermann, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 539 days.

(21) Appl. No.: 15/946,947

(22) Filed: Apr. 6, 2018

(65) Prior Publication Data

US 2019/0312439 A1    Oct. 10, 2019

(51) Int. Cl.
*H02J 3/46* (2006.01)
*B64D 41/00* (2006.01)
(Continued)

(52) U.S. Cl.
CPC ............... *H02J 3/46* (2013.01); *B64D 31/14* (2013.01); *B64D 33/00* (2013.01); *B64D 41/00* (2013.01);
(Continued)

(58) Field of Classification Search
CPC .... H02J 3/46; H02J 4/00; H01B 9/003; H01B 12/12; H01R 4/70; B64D 31/14;
(Continued)

(56) References Cited

U.S. PATENT DOCUMENTS 2,426,992 A * 9/1947 Folland .................... G01S 1/02
342/412
3,641,665 A * 2/1972 Matricon ................ H01L 39/14
29/599
(Continued)

FOREIGN PATENT DOCUMENTS

GB          2092835    * 12/1980
JP          08140253   * 11/1994
(Continued)

*Primary Examiner* — Assres H Woldemaryam
*Assistant Examiner* — Aaron M Rodziwicz
(74) *Attorney, Agent, or Firm* — Michael Stanley Tomsa; McAndrews, Held & Malloy, Ltd.; Eugene H. Nahm

(57) ABSTRACT

A power distribution system is disclosed for conducting electrical power through a combination of hollow tube conductors and flexible cabling. Each hollow tube conductor includes an end formed into flat pads. The flexible cabling comprises litz wire, and includes ends crimped to integral lugs. An end of the flexible cabling is coupled to an end of the hollow tube conductor. The other end of the flexible cabling is coupled to an electric device. The other end of the hollow tube conductor is coupled to another flexible cable, which is in turn coupled to another electric device. By connecting the hollow tube conductors, flexible cabling, and electrical devices in this way, an electrically conductive pathway may be established between the electrical devices. The power distribution system conducts alternating current (AC) power, and addresses the skin effect phenomenon that occurs when conducting AC power. The power distribution system can be utilized in the highly-constrained environment of electric aircraft, where weight and space is at a premium.

20 Claims, 15 Drawing Sheets

(51) Int. Cl.
  *H02J 4/00* (2006.01)
  *H01R 4/70* (2006.01)
  *B64D 33/00* (2006.01)
  *H01B 9/00* (2006.01)
  *B64D 31/14* (2006.01)

(52) U.S. Cl.
  CPC .............. *H01B 9/003* (2013.01); *H01R 4/70* (2013.01); *H02J 4/00* (2013.01); *B60L 2230/12* (2013.01); *B64D 2221/00* (2013.01)

(58) Field of Classification Search
  CPC .... B64D 33/00; B64D 41/00; B64D 2221/00; B60L 2230/12
  See application file for complete search history.

(56) References Cited

U.S. PATENT DOCUMENTS

| | | | | |
|---|---|---|---|---|
| 4,161,062 | A * | 7/1979 | Agatsuma | H01B 12/12 |
| | | | | 29/599 |
| 5,928,032 | A * | 7/1999 | Dreesen | H01R 9/0509 |
| | | | | 439/578 |
| 6,203,386 | B1 * | 3/2001 | Checchinato | H05K 3/326 |
| | | | | 439/877 |
| 6,250,975 | B1 * | 6/2001 | LaPointe | H01R 4/64 |
| | | | | 439/883 |
| 9,607,738 | B1 * | 3/2017 | Wu | H01B 11/20 |
| 10,217,547 | B1 * | 2/2019 | Kaneda | H01B 7/225 |
| 2011/0036624 | A1 * | 2/2011 | Kagimura | H05K 3/32 |
| | | | | 174/260 |
| 2011/0117773 | A1 * | 5/2011 | Delmas | H01R 13/533 |
| | | | | 439/544 |
| 2012/0326520 | A1 * | 12/2012 | Konya | H04B 5/0037 |
| | | | | 307/104 |
| 2013/0277087 | A1 * | 10/2013 | Hayakawa | H01B 3/50 |
| | | | | 174/107 |
| 2017/0149406 | A1 * | 5/2017 | Spiel | H01B 9/003 |
| 2017/0203839 | A1 * | 7/2017 | Giannini | B64C 5/16 |
| 2017/0246817 | A1 * | 8/2017 | Hopkins | H05B 3/34 |
| 2017/0287590 | A1 * | 10/2017 | Hayakawa | B60R 16/0231 |
| 2018/0151271 | A1 * | 5/2018 | Sidlyarevich | H01B 3/30 |
| 2018/0286538 | A1 * | 10/2018 | Hayakawa | H01B 7/0216 |
| 2019/0248308 | A1 * | 8/2019 | Hayakawa | B60R 16/0215 |
| 2020/0035382 | A1 * | 1/2020 | Sato | H01B 7/425 |

FOREIGN PATENT DOCUMENTS

| | | | |
|---|---|---|---|
| JP | 2006286385 A | * 10/2006 | |
| WO | WO-2017209299 A1 | * 12/2017 | ......... H01B 13/0207 |
| WO | WO-2018198476 A1 | * 11/2018 | ............... H01B 9/02 |

* cited by examiner

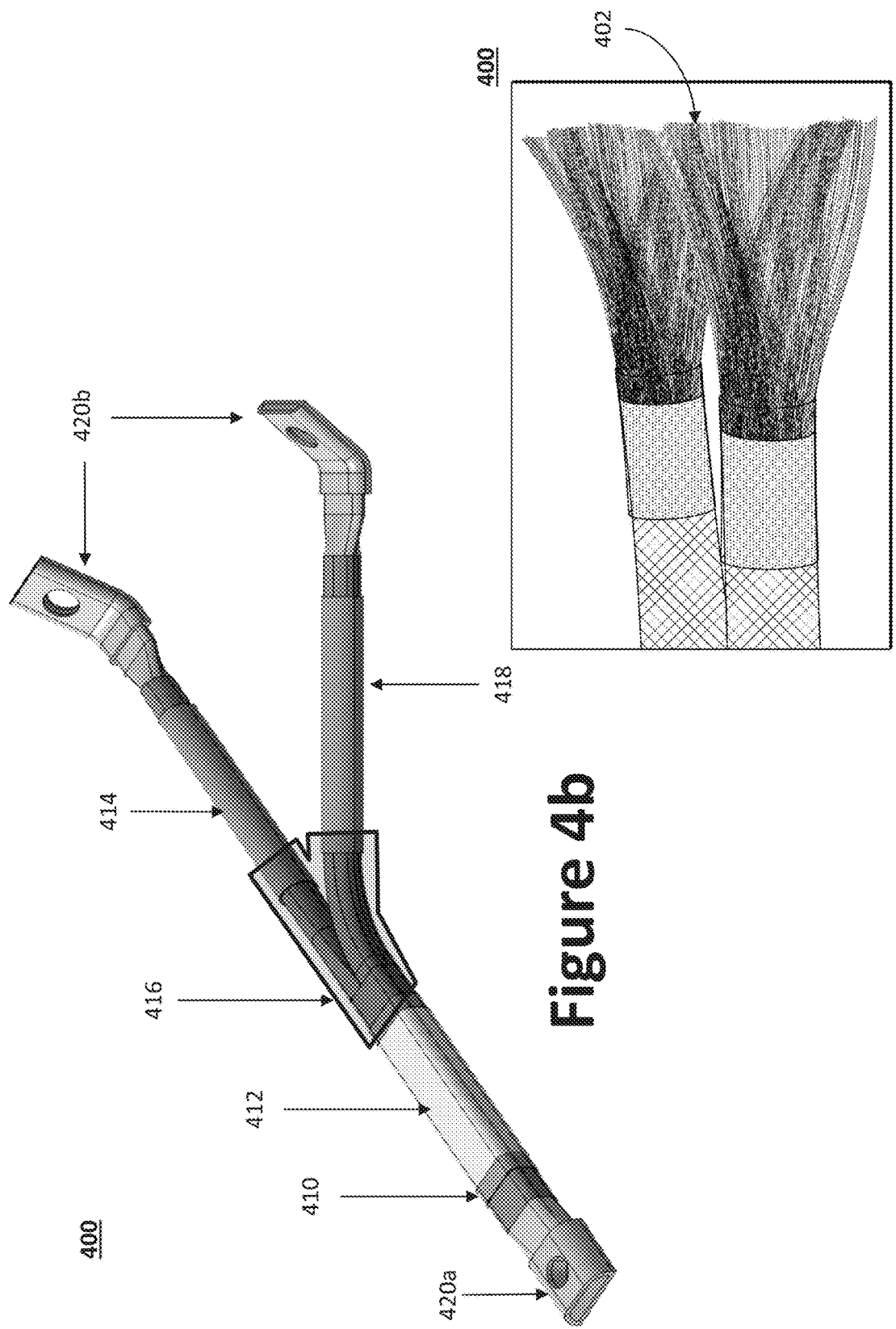

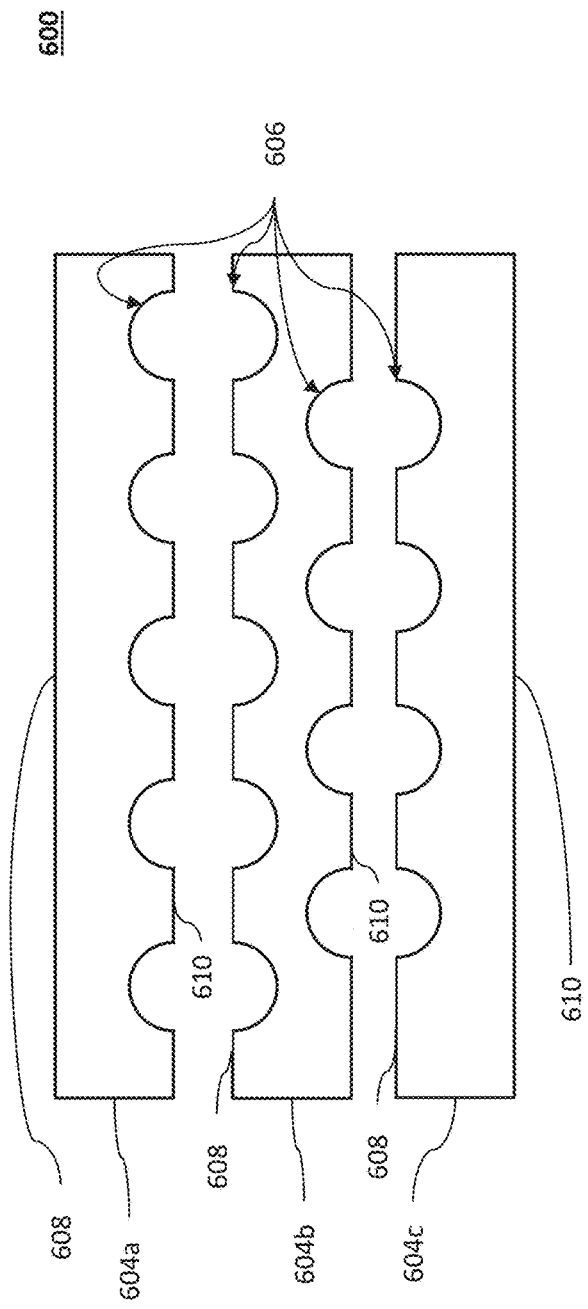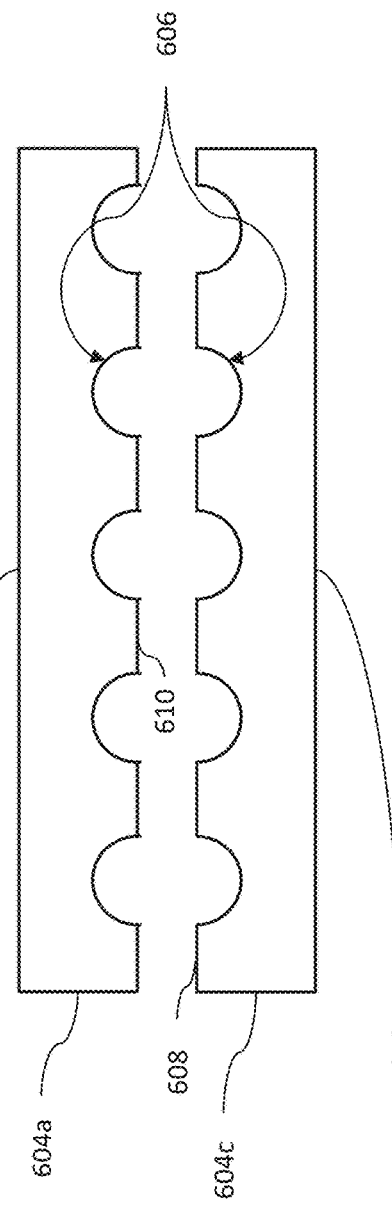

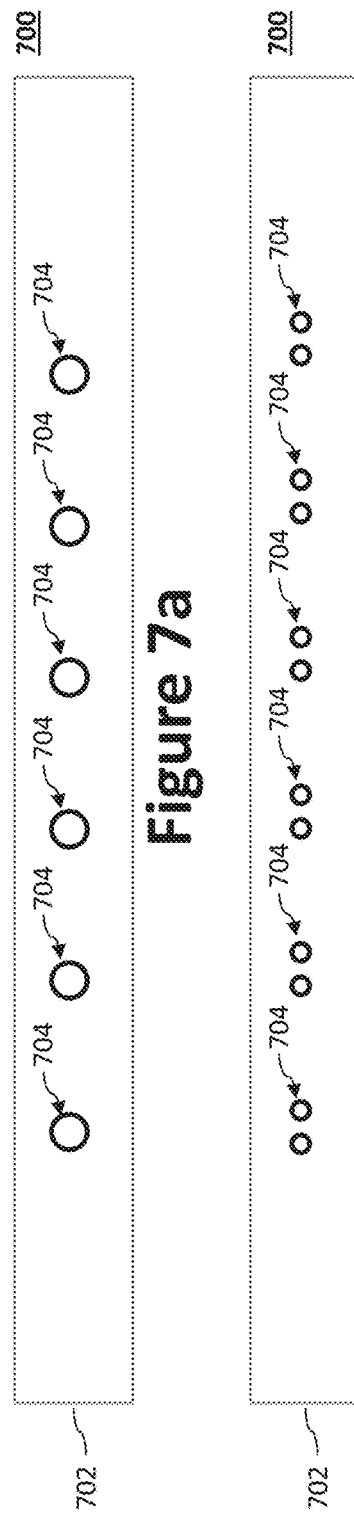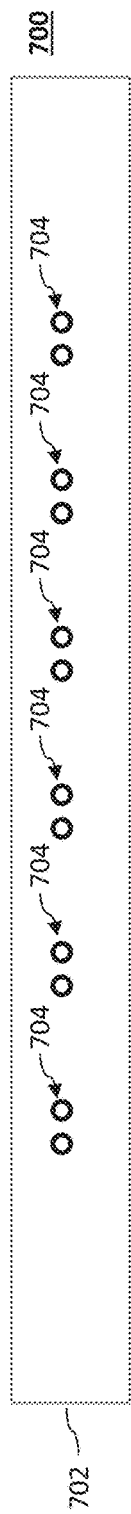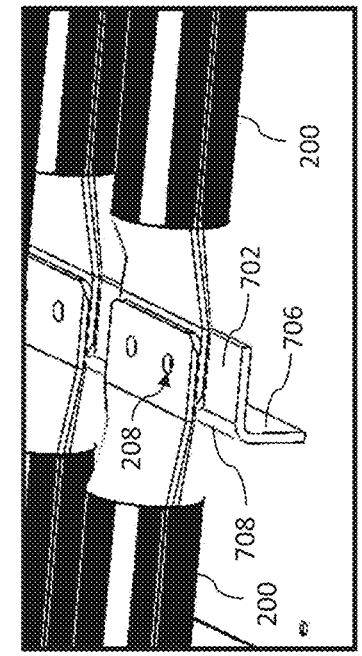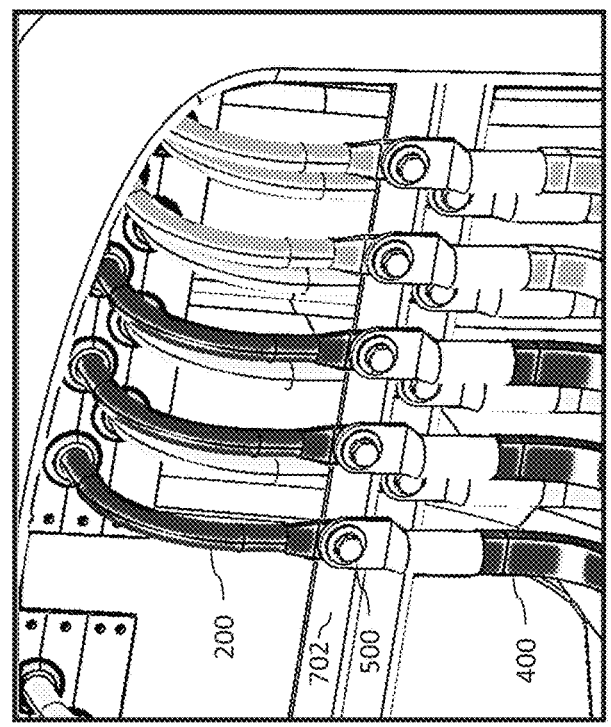
Figure 7a
Figure 7b
Figure 7c
Figure 7d

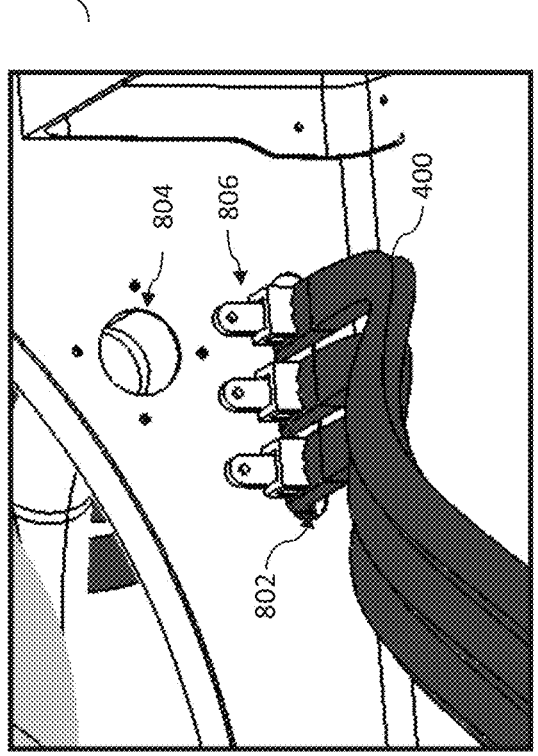
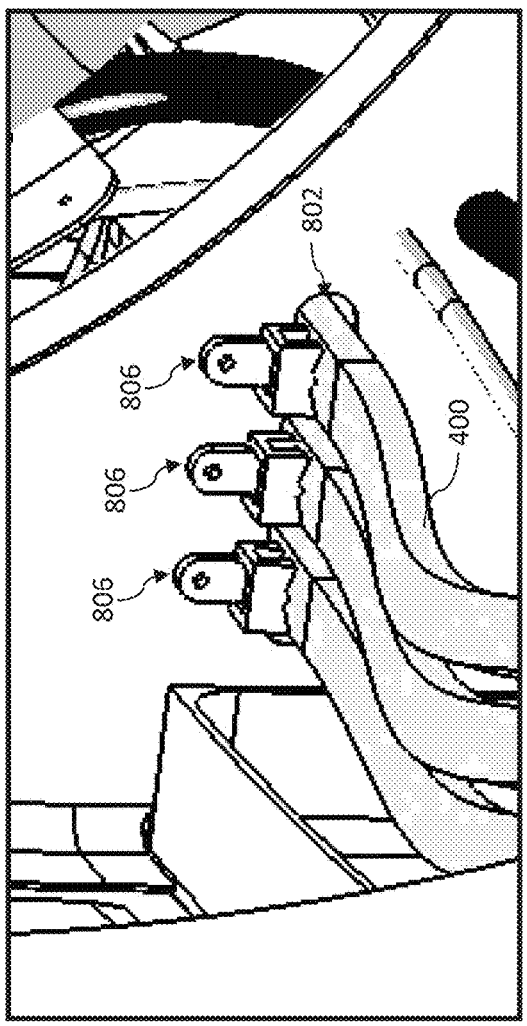
Figure 8a
Figure 8b

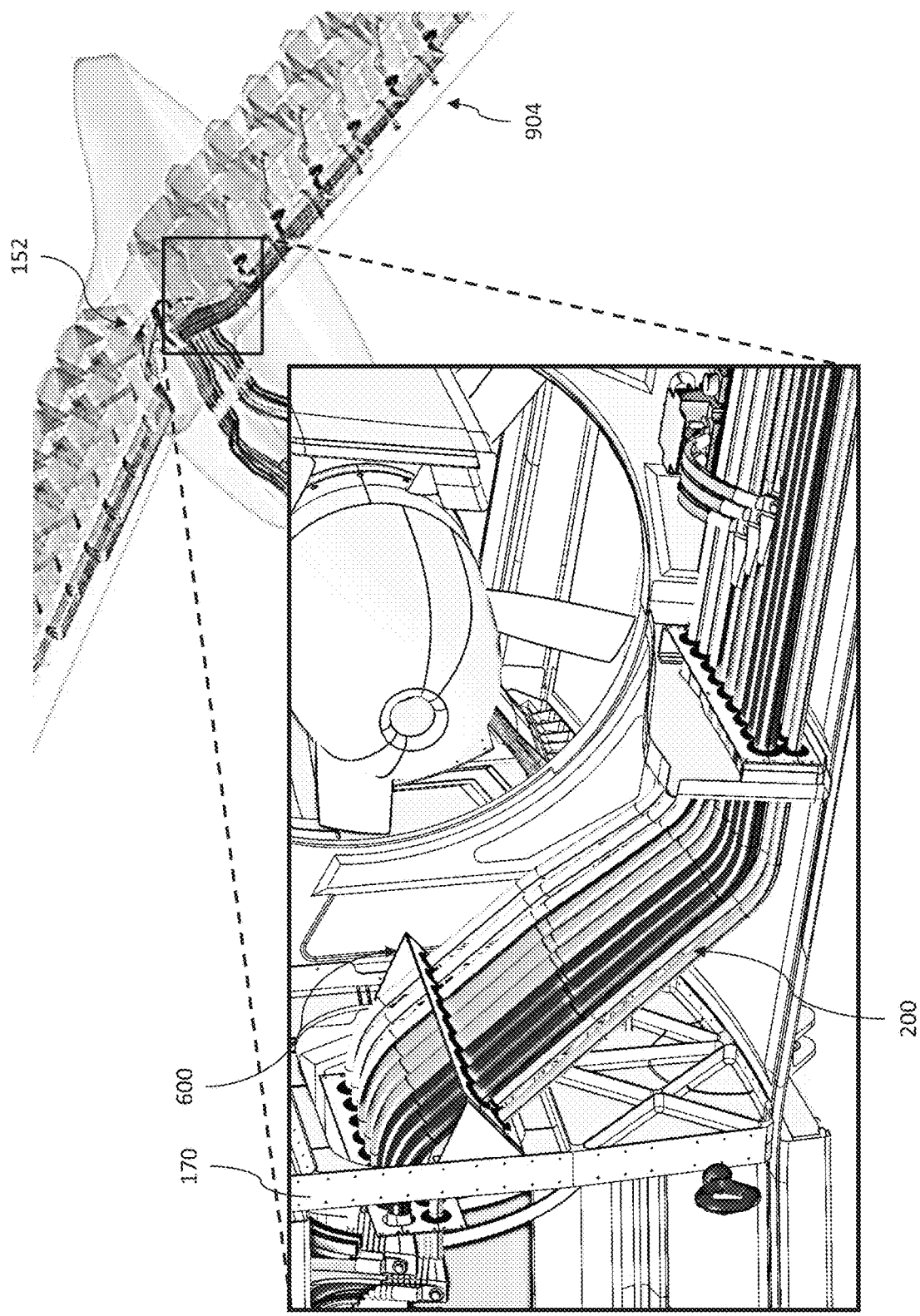

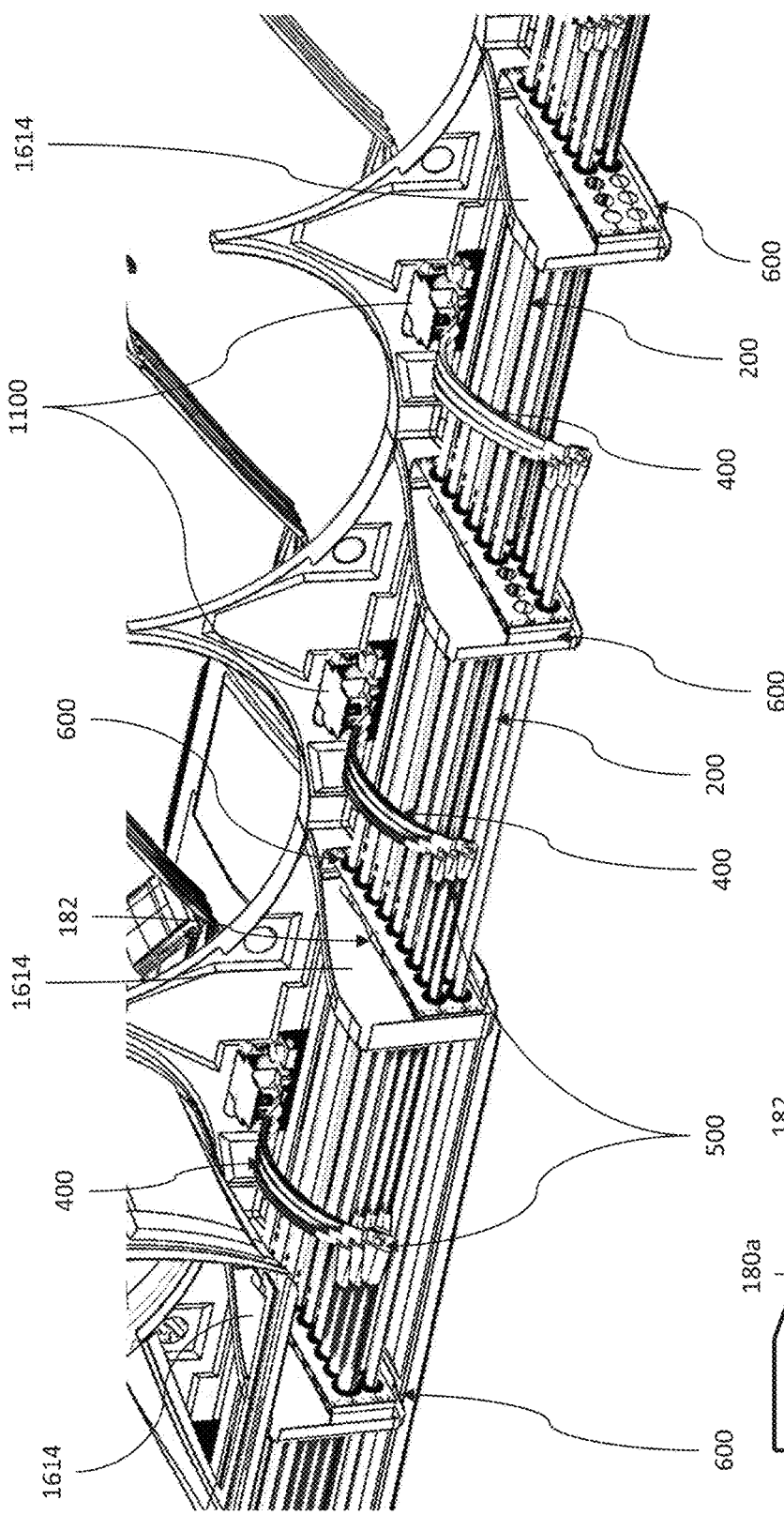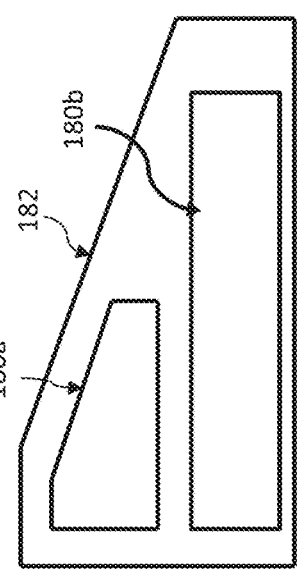

POWER DISTRIBUTION SYSTEM FOR AIRCRAFT

STATEMENT OF GOVERNMENT INTEREST

This invention was made with government support under Contract Number: HR0011-14-C-0014 awarded by the Defense Advanced Research Projects Agency (DARPA). The government has certain rights in the invention.

FIELD

The present disclosure relates to a power distribution system; more particularly to a power distribution system for an aircraft.

BACKGROUND

Aerial vehicles and aerospace products have stringent weight requirements and are often volume constrained. Electric propulsion systems, however, demand high transmission efficiency. When designing electric vehicle propulsion power transmission systems these weight and efficiency requirements act in opposition. Therefore, optimization is required to find a solution that satisfies both requirements. Where electrical power is transmitted using alternating current (AC), a phenomenon referred to as "skin effect" occurs. Skin effect is the tendency of AC electrical power to primarily flow near the surface (or skin) of a conductor, between the outer surface and a depth level called the skin depth. The skin depth becomes smaller with increasing frequency. Conductive material below the skin depth usually carries negligible current.

Aircraft with electric propulsion systems, such as all-electric and hybrid-electric aircraft, are just emerging onto the scene and have not yet established industry best practice for propulsion power distribution. Existing aircraft do not have a need to distribute thousands of amps of electrical current over the entire aircraft. Accordingly, large electric power distribution for aircraft has yet to be addressed in a practical form. Additionally, many conventional power distributions systems transmit direct current (DC) electrical power, or alternating current (AC) power at low frequency (e.g., around 50-60 hertz (Hz)). Power distribution systems that transmit AC electrical power at higher frequencies (e.g., 100s to 1000s of hertz) require unique design considerations. Therefore, a need exists for a power distribution system capable of distributing thousands of amps of AC electrical current throughout an aircraft at high frequency.

SUMMARY

The present disclosure relates to a power distribution system; more particularly to a lightweight alternating current (AC) power distribution system, such as for an aircraft.

According to a first aspect, a power distribution system for distributing electrical power through an electrically conductive pathway comprises: an electrical conductor having a hollow interior core defined by an outer shell, the outer shell having a thickness, wherein the thickness is determined based on at least one of skin and proximity effects; an electrically conductive cable; and an electrical coupler to electrically couple the electrical conductor to the electrically conductive cable, thereby creating an electrically conductive pathway.

According to a second aspect, an aircraft comprises: an electrical generator; a first electrical cable coupled to the electrical generator; an electrical motor; a second electrical cable coupled to the electrical motor; and an electrical conductor coupled to the first electrical cable and the second electrical cable, wherein an electrically conductive pathway is established between the electrical generator and electrical motor through each of the electrical conductor and the first and second electrical cables.

According to a third aspect, a method of distributing electrical power comprises the steps of: providing electrical power to a flexible conductor; conducting the electrical power from the flexible conductor to a rigid conductor through a joint connection; and conducting the electrical power through the rigid conductor to an electrical load.

According to a fourth aspect, an aircraft comprises: a plurality of electrical generators; a first set of electrical cabling coupled to the electrical generators; a plurality of electrical motors; a second set of electrical cabling coupled to the electrical motors; and a set of hollow tube conductors having first ends coupled to the first set of electrical cabling, and second ends coupled to the second set of electrical cabling, wherein an electrically conductive pathway is established between the electrical generators and electrical motors through the hollow tube conductors and the first and second sets of electrical cabling.

According to a fifth aspect, an electrical cable comprises: an electrically conductive exposed wire; and an electrically conductive lug that is electrically coupled to at least a portion of the exposed wire.

In certain aspects, each electrical cable includes an end having an integral lug crimped onto exposed wiring within the lug to electrically couple the lug to the electrical cable.

In certain aspects, each of the first and second electrical cables is a litz wire.

In certain aspects, electrical power is conducted between a plurality of electrical devices via the electrically conductive pathway.

In certain aspects, the electrical cable includes an insulator, wherein the insulator covers a portion of the exposed wire.

In certain aspects, the electrical cabling comprises litz wire.

In certain aspects, the electrical conductor comprises a conductive composite material.

In certain aspects, the electrical conductor comprises a litz wire. The litz wire may comprise an aluminum conductor or a copper conductor or a composite fiber conductor.

In certain aspects, the electrical conductor comprises aluminum or an aluminum alloy.

In certain aspects, the electrical conductor comprises an end having a flat pad. The flat pad may include a hole.

In certain aspects, the electrical conductor comprises an end having an integral lug crimped to an exposed portion of the electrically conductive cable.

In certain aspects, the electrical conductor comprises copper or a copper alloy.

In certain aspects, the electrical conductor is substantially rigid such that its orientation and position is fixed.

In certain aspects, the electrical coupler is electrically conductive and extends through a hole in the flat pad and a hole in the integral lug to couple the electrically conductive hollow tube to the flexible electrical cable.

In certain aspects, the electrical generator is configured to produce AC electrical power.

In certain aspects, the electrical generator is positioned in a fuselage of the aircraft.

In certain aspects, the electrical load is a motor. For example, the load may be a ducted fan motor of an aircraft.

In certain aspects, the electrical motor is configured to drive a ducted fan.

In certain aspects, the electrical motor is positioned in a canard wing of the aircraft.

In certain aspects, the electrical motor is positioned in a primary wing of the aircraft.

In certain aspects, the electrical motors are configured to drive ducted fans.

In certain aspects, the electrically conductive cable is flexible.

In certain aspects, the first electrical cable comprises an integral lug crimped onto exposed wiring within the lug to electrically couple the lug to the electrical cable.

In certain aspects, the flowing fluid conducts the waste heat to an area of a vehicle prone to malfunction due to temperature.

In certain aspects, the hollow tube conductor comprises two ends, each of the two ends formed to define a flat pad.

In certain aspects, the hollow tube conductors comprise a conductive composite material.

In certain aspects, the hollow tube conductors comprise aluminum or an aluminum alloy.

In certain aspects, the hollow tube conductors comprise copper or a copper alloy.

In certain aspects, the lug comprises a hole.

In certain aspects, the lug is crimped onto the exposed wire to electrically couple the lug to the wire.

In certain aspects, the method further comprises the step of providing a flowing fluid in thermal communication with the rigid conductor, wherein the flowing fluid conducts waste heat generated by the rigid conductor away from the hollow tube conductor.

In certain aspects, the plurality of electrical devices comprises a power source and a motor.

In certain aspects, the power distribution system is configured to conduct alternating current (AC) electrical power through an aircraft.

In certain aspects, the power source is a generator of the aircraft.

In certain aspects, the rigid conductor comprises a hollow interior core defined by an outer shell, wherein the outer shell has a thickness based on at least one of skin and proximity effects.

In certain aspects, the rigid conductor comprises a vent hole.

In certain aspects, the second electrical cable comprises an integral lug crimped onto exposed wiring within the lug to electrically couple the lug to the electrical cable.

DESCRIPTION OF THE DRAWINGS

The foregoing and other objects, features, and advantages of the devices, systems, and methods described herein will be readily understood from the following description of particular embodiments thereof, as illustrated in the accompanying Figures, where like reference numbers refer to like structures. The figures are not necessarily to scale, emphasis instead being placed upon illustrating the principles of the devices, systems, and methods described herein.

FIG. 4b illustrates a perspective view of a litz wire with lugs.

FIG. 4c illustrates a stripped litz wire with exposed wire strands.

FIGS. 7a through 7d illustrate various examples of a bracket joint.

FIGS. 8a and 8b illustrate examples of a mounting component to secure parallel flexible litz conductors.

FIG. 9b illustrates a side view of the aircraft of FIG. 9a.

FIG. 11c illustrates an enlarged view of a portion of a power distribution system at the primary wing.

FIGS. 12a and 12b illustrate aspects of the power distribution system in the primary wing.

DESCRIPTION

Figure 1:
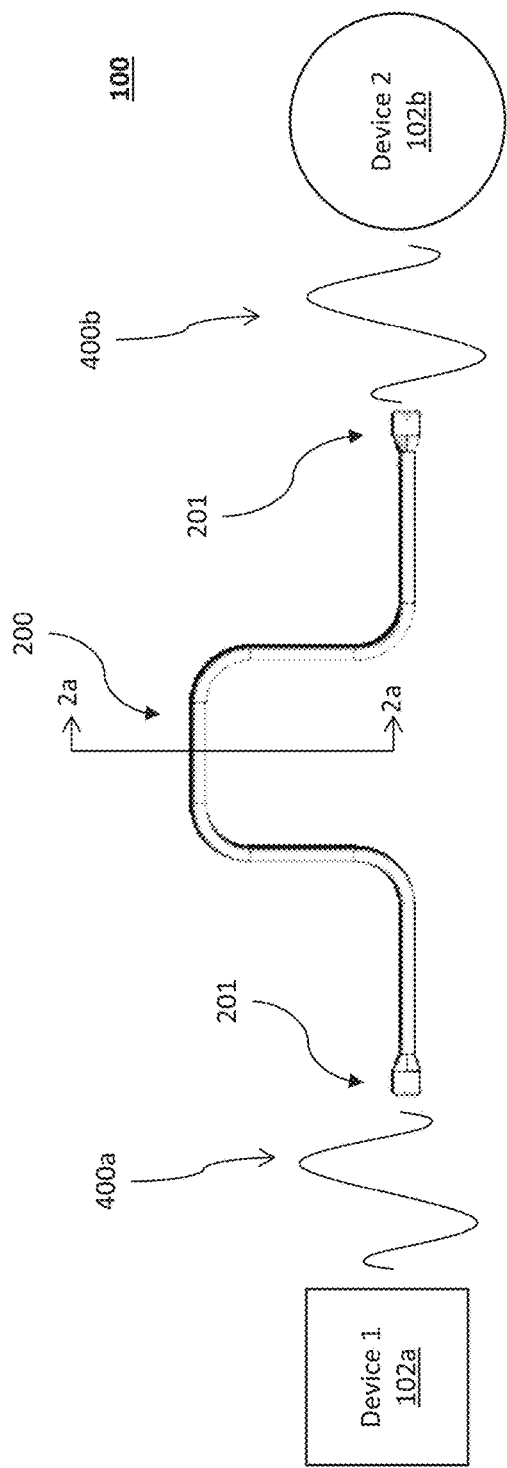
FIG. 1 illustrates a diagram illustrating an example power distribution system.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. In the following description, it is understood that terms such as "first," "second," "top," "bottom," "side," "front," "back," "upper," "lower," "inner," "outer," "leading edge," and/or "trailing edge," and the like, are words of convenience and are not to be construed as limiting terms. For this application, the following terms and definitions shall apply:

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "about" and "approximately," when used to modify or describe a value (or range of values), mean reasonably close to that value or range of values. Thus, the embodiments described herein are not limited to only the recited values and ranges of values, but rather should include reasonably workable deviations The term "aircraft" refers to a machine capable of flight, including, but not limited to, blended wing body (BWB) aircraft, traditional aircraft, unmanned aerial vehicles (UAVs), drones, blimps, dirigibles, personal aircrafts (e.g., jetpacks), and/or vertical take-off and landing (VTOL) aircraft. VTOL aircraft may include both fixed-wing aircraft (e.g., Harrier jets), rotorcraft (e.g., helicopters), and/or tilt-rotor/tilt-wing aircraft.

The terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "coupled," "coupled to," and "coupled with" as used herein, each mean a structural and/or electrical connection, whether attached, affixed, connected, joined, fastened, linked, and/or otherwise secured.

The term "exemplary" means serving as a non-limiting example, instance, or illustration. As utilized herein, the terms "e.g.," and "for example" set off lists of one or more non-limiting examples, instances, or illustrations.

The system and components described herein may provide a lightweight solution to distribute electrical power throughout an aircraft, or other vehicles. The system and components may be configured for a specific alternating current (AC) frequency and to provide an efficient means to distribute power for the given frequency. The system and components described herein provides features to mitigate phenomena such as skin effect, self and mutual inductance and capacitance, and thermal dissipation. The disclosed system may further orient electrical conductors relative to each other and/or other phase sets to minimize/optimize mutual induction, while maximizing thermal dissipation. In some examples, electrical induction may be considered in positioning tube conductor(s) such that other components of the system may power themselves via induction produced from the magnetic field of the tube conductor(s). Accordingly, the system of the present disclosure may provide a more weight efficient means for transmitting AC electrical power than most power distribution systems that rely on multi-stranded wire.

Most modern power distribution systems use stranded copper wire. Wires are typically crimped or soldered using industry best practice standards. Connections may be made with zinc plated copper lugs. Occasionally, bus bars are used to easily distribute high current to multiple wires from a single source. However, bus bars do not usually carry current over long distances because it can be more easily accomplished with stranded wire. Examples of modern aircraft electrical standards include the Federal Aviation Administration (FAA) Advisory Circular AC 43.13-1b (Chapter 11) and military handbook MIL-HDBK-522.

Most known high current, AC power distribution solutions pertain to terrestrial power distribution, which is heavy, large, and not conducive to aircraft constraints of mass, volume, and structural integrity (e.g., strength and/or stiffness). The presently disclosed solutions, however, are lighter weight, and more optimized and/or efficient in terms of, for example, mass, power loss, and/or integration perspective. Additionally, the disclosed power distribution system may provide geometric flexibility to accommodate various configurations. Certain aspects can provide cost benefits such as the simplicity of the integral ring lug connectors. The proposed solutions may be used in a variety of vehicles, such as aircraft, marine craft, automobiles, spacecraft, etc.

The present disclosure is directed to a system for transmitting alternating current (AC) via a combination of electrical conductors which can be in the shape of formed tubes (e.g., hollow tubes) and litz wire. In some examples, the disclosed system and method may be applied to the highly-constrained environment of an all-electric and/or hybrid-electric aircraft. In some examples, the formed tubes may be fabricated using aluminum, which offers a minimum mass for a given conductor resistance; however the tubes may be fabricated from other conductive materials. Other suitable conductive materials include, inter alia, copper, conductive composites, carbon nanotubes (CNTs), etc. The tubes may be terminated by forming (e.g., flattening) the tube ends into flat pads that allow for connection to litz wire. The litz wire offers a light weight, flexible, and low cross-sectional area solution for parts of the system that cannot accommodate rigid conductors. The litz wire may be terminated with integral lugs that are lighter than current off the shelf options.

The diameter and thickness of the tubes can be optimized to minimize losses and weight, while also providing sufficient surface area for appropriate cooling. Lug terminals can be crimped onto the stripped end of the wires. A hole may be drilled directly through the flat crimped lug to allow for mechanical connection directly to electrical joints. This method can reduce the weight of the connection when compared to traditional lugs.

Power Distribution System (PDS).

FIG. 1 illustrates a simple diagram of the power distribution system 100 (PDS). In some examples, the PDS 100 distributes AC electrical power; however the PDS 100 may also be used to distribute direct current (DC) electrical power, a combination of AC and DC power, alternative waveforms, and/or other forms of electrical power.

In some examples, the PDS 100 includes a hollow tube conductor 200 electrically coupled to a flexible electrical cable 400 at the ends of the hollow tube conductor 200. In some examples, the flexible electrical cable 400 comprises litz wire. A first litz wire 400a is coupled to a first electrical device 102a, and second litz wire 400b is coupled to a second electrical device 102b. The electrical devices 102 may be any device that uses, generates, modifies, measures, etc. an electrical signal. For instance, the first device 102a may be a generator and/or electronic speed controller, while the second device 102b may be an electric motor. As another example, the first device 102a may be an inverter while the second device 102b is a heating, ventilation, and/or air conditioning system, a radar system, radio communications equipment, and/or a directed energy weapon. As a further example, the first device 102a may be a navigational controller while the second device 102b is a fan controller. In each case the PDS 100 conveys (e.g., conducts, transmits, conveys, communicates, carries, etc.) the electrical signal from a first device 102a to a second device 102b, and/or vice versa, through the hollow tube conductor 200 and/or litz wire 400. In certain aspects, CNT material may be embedded within a composite structure to transfer power and/or signals.

While the diagram of FIG. 1 illustrates only two devices (i.e., a first device 102a and a second device 102b), this is just to illustrate the basic operation of the PDS 100. In other examples, there may be more than two devices. Further, there may also be more than just one hollow tube conductor 200, and more than just two instances of litz wire 400. The PDS 100 may be applied to single phase and/or multi-phase electrical systems.

Hollow Tube Conductor.

Figure 2A:
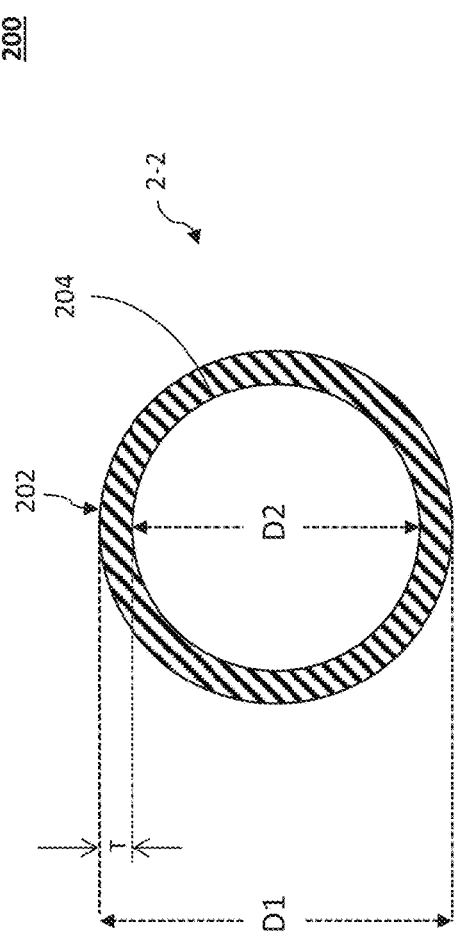
FIG. 2a illustrates a cross section of the hollow tube conductor shown in FIG. 1, along line 2a-2a in FIG. 1.
Figure 2B:
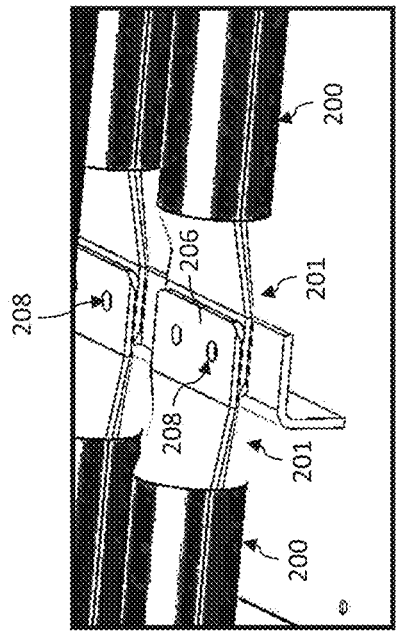
FIG. 2b illustrates a perspective view of a portion of a hollow tube conductor.

FIGS. 2a through 2c illustrate the hollow tube conductor 200 in greater detail. FIG. 2a shows a cross-section of the hollow tube conductor 200 at cross-section 2a-2a of FIG. 1. As illustrated, the interior of the conductor 200 defines a hollow interior core 204. Where the PDS 100 carries AC electrical power, only the exterior cylindrical shell 202 of the hollow tube conductor 200 carries AC electrical power due to the skin effect of alternating current. Thus, the interior may be substantially hollow in order to reduce the weight of the conductor 200. As best illustrated in FIG. 2a, the conductor 200 includes an outer skin/shell 202 and a hollow inner core 204. The hollow inner core 204 extends through the length of conductor 200. For example, the hollow inner core 204 may extend through the entire length of conductor 200, or substantial portion thereof. The outer shell 202 has a thickness T equal to the distance between the outer shell 202 and the inner core 204. The hollow tube conductor 200 further includes an inner diameter D2, being the diameter of the inner core 204, and an outer diameter D1, being the diameter of the outer shell 202. In some examples, the thickness T of the shell 202 of the hollow tube conductor 200 may be no greater than the skin effect depth, which may be dependent on the electrical properties (e.g., resistivity, magnetic permeability, and/or permittivity) of the hollow tube conductor 200, an AC frequency, and/or a harmonic frequency in the AC waveform. Mutual inductance and/or proximity effects from adjacent conductors may also induce modification of a cross sectional area distribution and/or cross sectional geometry of the hollow tube conductor 200 to something non uniform. Furthermore, the thickness T may vary for structural reasons, such as, for example, to allow for flexibility in a specific direction in which the conductor is thinner in some areas and thicker in others In some examples, the skin depth may be described by the equation:

$$\delta = \sqrt{\frac{\rho}{\pi f \mu}} \sqrt{\sqrt{1 + (2\rho\pi f\epsilon)^2} + 2\rho\pi f\epsilon}$$

where ρ=Resistivity of conductive material, f=Frequency of current, μ=Magnetic permeability of conductive material, and E=Permittivity of conductive material While the hollow tube conductor 200 is illustrated as substantially cylindrical with a substantially circular cross-section, the cross section may be a different, non-circular shape (e.g., oval, quadrilateral, etc.). Various shapes may be used to provide flexibility in places it is required and/or to dictate how the conductor flexes under load. The cross-sectional geometry may be shaped to minimize and/or mitigate the mutual inductance and/or proximity effects from adjacent conductors. In some examples, open shapes, such as flat plates, TT' (a shape comprising two substantially parallel linear portions connected by a lower arcuate portion), 'X' (a shape comprising two perpendicular linear portions intersecting at an approximate middle of each portion), and/or star shapes may be used. Each of these shapes may have their own advantages when it comes to convective cooling. In some examples, circular (and/or cylindrical) hollow tube conductors 200 may offer the minimum area for a given cross sectional area and/or wall thickness. This may be unfavorable to convective cooling. A circular hollow tube conductor 200 may be convenient to manufacture, bend, and/or integrate with a defined structure (e.g., a structure of an aircraft). A hollow tube conductor 200 may also be widely available in many dimensions. Further, circular hollow tube conductors 200 may offer a stiff cross section in all directions for a given profile thickness. When a closed profile is used, consideration must be made to the hollow void along the length of the hollow tube conductor 200. That is, if both ends of a hollow tube conductor 200 are crimped flat for electrical connection, fluids, debris, and/or particles in the void can become trapped. Therefore, one or more vent holes 210 may be positioned adjacent the flat pad 206 of the hollow tube conductor 200 and/or along the length of the hollow tube conductor 200.

In some examples, each hollow tube conductor 200 is substantially rigid, and configured to convey (conduct) electrical power through similarly rigid areas of structure. Unlike the flexible electrical cable 400 (e.g., litz wire), the hollow tube conductors 200 may be bent and formed to a desired shape prior to installation. Once the tube conductors 200 are installed in place, the hollow tube conductors 200 may be substantially fixed in that desired shape, orientation, position and/or form thereafter, such that it would be substantially difficult to alter the shape and/or form after the installation. The PDS 100 may rely on the stiffness of each hollow tube conductor 200 to prevent contact between adjacent conductors 200 under electromagnetic, gravitational, and inertial forces. This may eliminate the need for electrical insulation over the exterior surface of the hollow tube conductors 200, and thus may further reduce the weight of the PDS 100.

Figure 3:
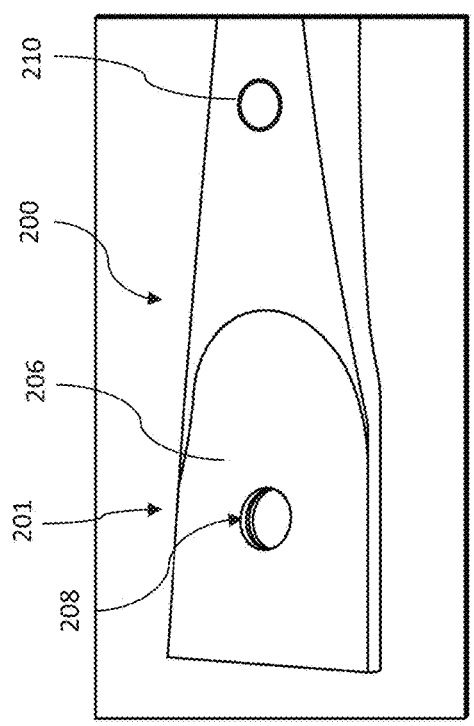
FIG. 3 illustrates an alternative example of a hollow tube conductor.

During the forming process, the ends 201 of each hollow tube conductor 200 may be crushed (e.g., flattened) to define a flat pad terminal 206, which allows for connection with another conductor, such as a litz wire 400 or another hollow tube conductor 200, for example. As illustrated in FIG. 2b, each hollow tube conductor 200 may have an end 201 that is formed into a flat pad 206. The flat pad 206 can include a hole 208 at the approximate center of the pad 206. In some examples, the flat pad 206 may include a plurality of holes 208, as shown in, for example, FIG. 3. The pad 206 and one or more holes 208 allow electrical connection to other hollow tube conductors 200, litz wire 400 and/or other cables, wires, conductors, etc., as further explained below. In some examples, a plug may be inserted into the hollow tube conductor 200 before crushing it such that the hollow tube conductor 200 conforms to the shape of the plug and/or provides additional thickness necessary or desired at the joint.

While one solution for providing a connecting interface to the hollow tube conductors 200 is to crush and drill the ends 201 of the hollow tube conductor 200, there are other mechanical alternatives. For example, p-clamp connectors, expanding inserts, and/or swage style connectors can be used to provide an electrical joint to hollow tube conductors. While the weight is increased, these offer certain advantages by allowing on-aircraft termination and easy adjustments. In contrast, the crushed and drilled end must be completed prior to installation.

In some examples, the hollow tube conductor 200 may be fabricated using aluminum and/or aluminum alloy; as aluminum formed tubes offer the minimum mass for a given conductor resistance. Although aluminum is a weight optimal material choice, copper may also be used to form the hollow tube conductor 200. Compared to aluminum, copper offers the advantage of being less affected by surface oxidation; however, aluminum may be preferred for a lower weight system because it offers a lower mass based conductivity of 72 $\mu\Omega kg/m^2$ compared to copper, which is 150 $\mu\Omega kg/m^2$. The material of the hollow tube conductor 200 should not be construed as limited to the above-identified examples; therefore, any electrically conductive metals and/or composite materials may be used.

The diameter D1 and thickness T of the hollow tube conductor 200 may be optimized to minimize losses and weight, while also providing sufficient surface area for appropriate cooling. Accordingly, the diameter D1 of the hollow tube conductor 200 may be selected as a balance between (i.e., as a function of) weight, cooling, and other factors. The larger the diameter, the more weight that is added to the PDS 100. On the other hand, larger diameter D1 leads to larger surface area, and the more surface area a conductor has, the greater its ability to reject heat via convective cooling. Also, larger diameter D1 hollow tube conductors 200 have greater stiffness in bending and may be left unsupported over greater spans, thus reducing the weight (and cost) of mounting materials that would otherwise be needed.

In practical application, the diameter D1 of the hollow tube conductor 200 may be limited by interior volume and geometric constraints. The thickness T of the hollow tube conductor 200 may be limited by durability and buckling loads. Mutual inductance, proximity effect, and convective heating between adjacent hollow tube conductors 200 constrain the radial spacing of parallel conductors. All of these competing design pressures result in a design space with many variables. A highly-optimized design may tailor the conductor diameter thickness and spacing based on the local cooling, magnetic, and geometric environment. In some examples, the hollow tube conductor 200 may have a thickness T of 1.47 millimeters (mm) or 0.058 inches. In some examples, multiple size hollow tube conductors 200, with differing diameters D1, D2, and/or thickness T may be used in the PDS 100.

In some examples, the waste heat from hollow tube conductors 200 may be used as heat exchangers to preheat fluids such as fuel or lubricant. The preheated fluids may be inert, and/or used only to transport waste heat to other areas of the vehicle that need heating (such as leading edges for de-icing and/or to keep equipment functional at extreme altitudes and low temperatures). Additionally, or alternatively, they may be cooled via advection heat transport via internal fluid flow. However, this can introduce complexity, leaks, fire hazards, and/or increased weight.

Litz Wire.

Figure 4A:
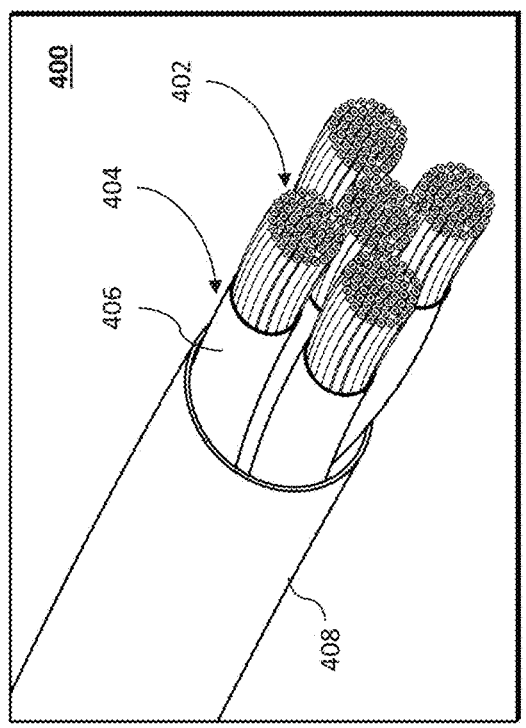
FIG. 4a illustrates a partially broken away perspective view of a litz wire.

Litz wire (also called magnet wire) is a type of woven electrical wire configured to carry AC power. As illustrated in FIG. 4a, the example litz wire 400 employs many thin wire strands 402, individually insulated and/or twisted or woven together into a bundle 404. Each thin wire strand 402 may be individually insulated with one or more coatings of the same and/or different polymer compounds. Each thin wire strand 402 may be less than the skin-depth; therefore an individual strand 402 does not suffer an appreciable skin effect loss. The result of the winding patterns is to equalize the proportion of the overall length over which each strand 402 is at the outside of the bundle 404, an effect not achieved with simple twisted-strand wire. The impedance of each litz strand 402 is selected to be roughly equal, thereby evenly distributing the current throughout the cross section of the litz wire 400. For a given conductor material, amperage, and desired voltage drop, litz wire 400 offers the minimum required cross section of any wire construction. The litz wire 400 may be an aluminum conductor, a copper conductor, a composite fiber conductor, and/or some other type of electrically conductive material. Litz wire 400 is designed to reduce the skin effect and proximity effect losses in conductors used at frequencies up to about 1 MHz.

Flexible litz wire 400 is used in the PDS 100 to transport power where flexibility and/or reduced cross section are preferable and/or to directly connect with electrical devices, such as the connections to generators, motors, controllers, etc. Flexibility may be preferred because power must be transmitted over a moving joint and/or to allow easier installation of electrical components such as motors or generators, for instance. A small cross section may be preferred for transmitting through constricted openings, for example. Litz wiring offers the smallest cross section for carrying AC power for a given conductor material.

As illustrated in FIG. 4a, each wire strand bundle 404 may include a bundle insulator 406. The collection of bundles 404 may be braided together inside of an outer insulator 408. While FIG. 4a illustrates an example litz wire 400 configuration, there are several other types of configurations within the contemplation of this disclosure. For example, each litz wire 400 may include only one bundle 404, rather than several bundles; the litz wire 400 may include only an outer insulation 408, with no bundle insulation 406; the litz wire 400 may include a central fiber core, with one or more bundles 404 wrapped around the central fiber core; the litz wire 400 may have a more rectangular profile, or some other profile shape, rather than the circular/cylindrical profile shown in FIG. 4a, etc.

As illustrated in FIG. 4b, the litz wire 400 may be covered by a first insulating layer 410. The first insulating layer 410 may be in addition to the outer insulation 408 or an alternative to the outer insulation 408. The first insulating layer 410 may be composed of a polyimide film, such as Kapton and/or Kapton tape, for example. The Kapton may include adhesive or exclude adhesive. In some examples, the first insulating layer 410 may comprise a Polyamideimide varnish. A second insulating layer 412 may also be used. The second insulating layer 412 may comprise a flame resistant material, such as a flame resistant meta-aramid polymer (e.g., Nomex, available from DuPont). In alternative examples, the second insulating layer 412 may comprise a flame resistant para-aramid synthetic fiber (e.g., Kevlar, available from DuPont), a nylon polymer, and/or other suitable material. In some examples, the second insulating layer 412 may be configured to protect against abrasion. The litz wire 400 may also include a sleeve 414, such as an ultra-flex fiber glass sleeve.

A wire transition 416 may be used with the litz wire 400 in order to provide a branch 418 (or split). In order to manufacture the Y transition, the outer layers of insulation may be removed. Heat shrink tubing, and/or self-fusing tape may be used to insulate the transition region. As illustrated in FIG. 4b, the wire transition 416 comprises a Y shaped transition that allows two branches of half the cross sectional area off the main litz wire 400 run. Other transitions may also be used to provide as many branches as desired from the main wire bundle. These branches may be equally distributed or unequally depending on the current required to flow through each branch. The varying resistance of each branch could detrimentally affect current distribution however and has to be carefully considered.

Figure 4D:
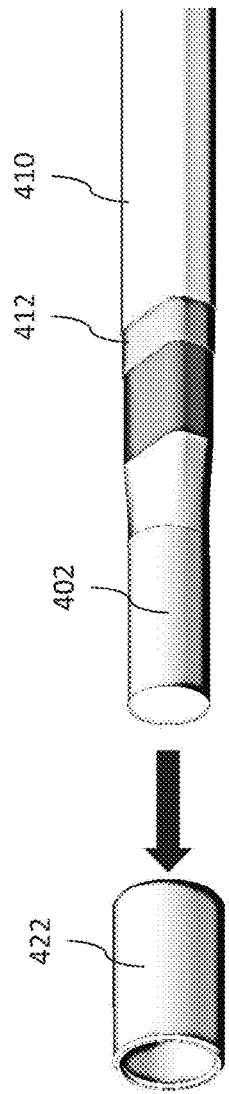
FIGS. 4d and 4e illustrate an example process of joining a litz wire with a lug.
Figure 4E:
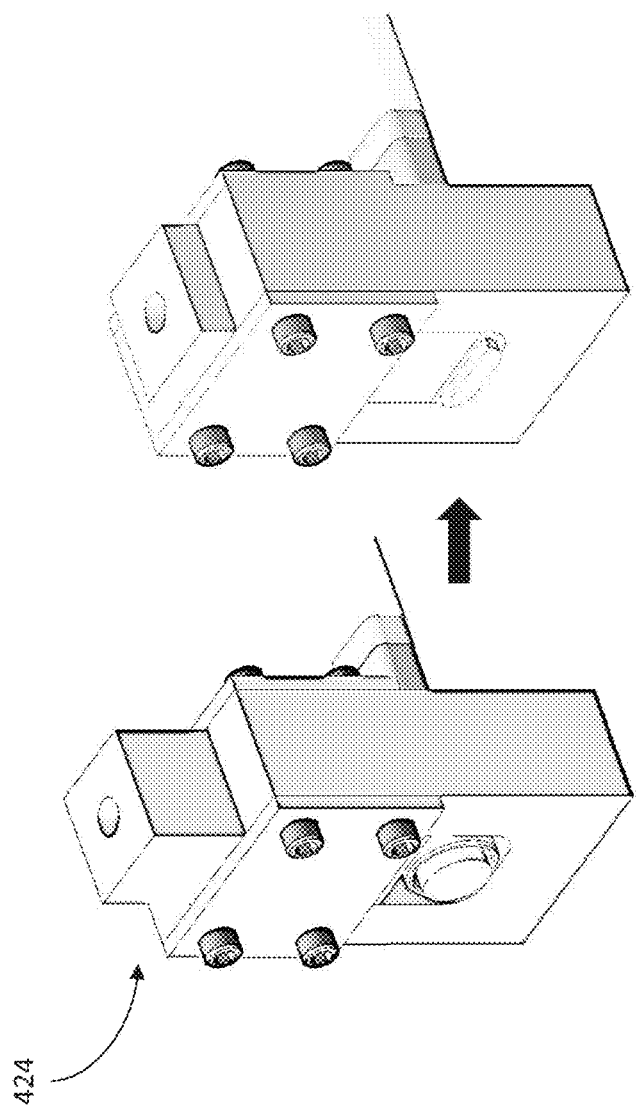
Figure 4F:
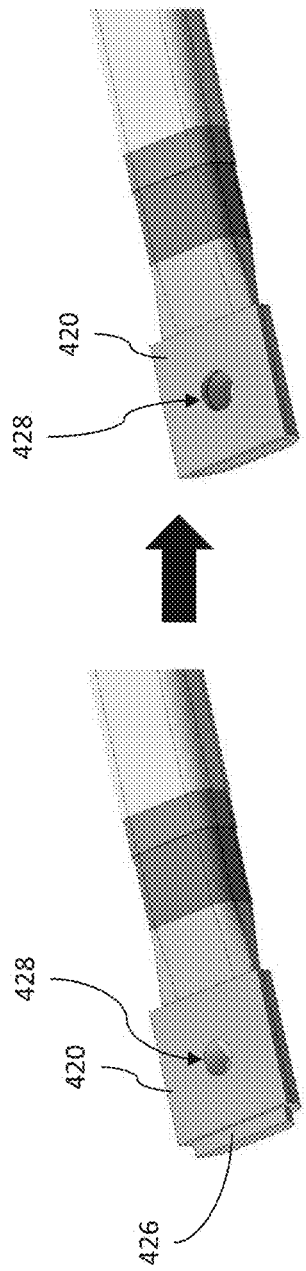
FIG. 4f illustrates the lug after undergoing the crimping process depicted in FIGS. 4d and 4e.

The litz wire 400 may be terminated with integral lugs 420 that are smaller and lighter than current off the shelf options. As illustrated in FIG. 4b, the integral lug 420 may be a straight lug 420a or a bent lug 420b. In order to couple the litz wire to the lugs 420, the litz wire 400 may first be stripped of its insulators so that the individual wire strands 402 are exposed, as shown for example in FIGS. 4c and 4d. The exposed litz wire 400 is then inserted into a short segment of lug tubing 422, as illustrated in FIG. 4d. The lug tube 422 is crimped, such as through use of a crimping machine 424, as shown, for example, in FIG. 4e. The crimped lug 420 provides a strong mechanical and electrical connection between the lug 420 and the wire strands 402 of the litz wire 400. Any excess wiring 426 that extends past the end of the lug 420 can be trimmed. Once crimped, as illustrated in FIG. 4f, a hole 428 can be drilled and/or punched in the lug 420 to provide a mechanical connection point to an adjacent conductor. In some examples, more than one hole 428 may be drilled and/or punched in the lug 420. The lug 420 may be kept straight or bent, depending on the needs of the system and intended use of the litz wire 400. This method provides a hard flat connector terminal that is smaller and lighter than traditional lugs, such as ring lugs. Traditional ring lugs typically have a barrel for crimping and a lug with a through hole for connecting that is separate from the barrel. The disclosed solution integrates these into one unit, where the barrel (e.g., tube 422) also serves as a lug 420, further reducing weight, and size.

In some examples, the litz wire 400 lug 420 is a minimalistic design. However, it is possible to add custom features and geometry to the crimped lug 420. One such feature is an extended surface or fin for cooling purposes. This could be used to mitigate the local heating due to contact resistance associated with electrical joints. Another custom feature could be to bow the lug. Upon fastening the lug 420 to the electrical joint, the lug 420 would flatten to be flush with the other conductor. This flattening introduces preload in the joint that would take up the lost pressure upon thermal deformation. Another optional feature is a flare on the lug 420, which may reduce stress concentration.

A light-weight alternative to the crimped connection is to fuse molten metal (e.g., solder) onto the end of the wire to create a solid block. This block could then be drilled and connected similar to the integral ring lug concept. Another alternative is to crimp the litz wire 400 directly into an end of the tube defined by hollow tube conductor 200. This may eliminate the need for the lug entirely. While such a connection would be more permanent, an advantage of this alternative is the potential to reduce connection resistance by reducing the number of connections while also reducing weight by eliminating additional components such as bolts and nuts typically required in a connection joint (as described in the next section)

Litz Wire and Hollow Tube Conductor Joint Connection.

Figure 5:
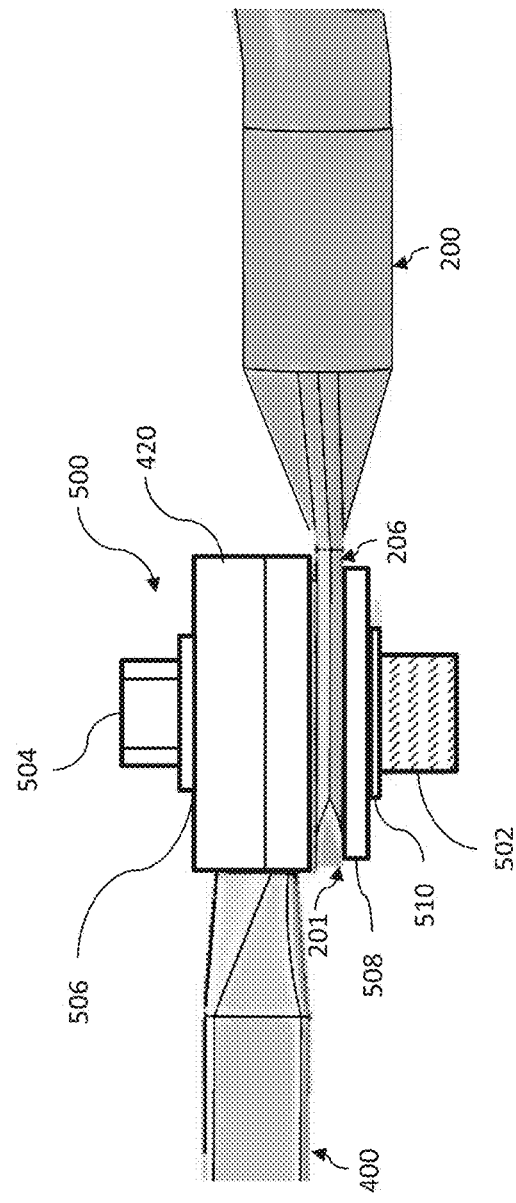
FIG. 5 illustrates a joint connection between a hollow tube conductor and litz wire.

As illustrated in FIG. 5, the hollow tube conductor 200 and litz wire 400 may be connected at a joint 500 using their respective flat pad 206 and crimped lug 420 terminals. The flat pad 206 and crimped lug 420 terminals may be aligned by their respective holes 208, 428 and then coupled together. In the example shown in FIG. 5, a fastener 502 connects the flat pad 206 and crimped lug 420 terminals. A lock nut 504 is coupled to the top of the fastener 502. A first washer 506 is positioned between the lock nut 504 and the crimped lug 420 of the litz wire 400. The flat pad 206 of the hollow tube conductor 200 is positioned below the crimped lug 420 of the litz wire 400 and/or the ends 201 of the hollow tube conductor 200 (e.g., at the flat pad 206). A second washer 508 (such as a fender washer, for example) and a third washer 510 (such as a Belleville spring washer, for example) are positioned below the crimped lug 420 of the litz wire 400, and connect to the fastener 502. The lock nut 504, fastener 502, first washer 506, second washer 508, and/or third washer 510 may be electrically conductive, so as to assist in electrically coupling the hollow tube conductor 200 to the litz wire 400. In some examples, the first washer 506, second washer 508, and/or third washer 510 may be electrically insulated.

In some examples, the lock nut 504 may be part of the fastener 502. In some examples, the joint 500 may be made with a hollow tube conductor 200 and/or a litz wire with more than one hole 208, 428. In such an example, the fastener 502, lock nut 504, and first, second, and third washer 506, 508, 510 arrangement described above may be used for each hole 208, 428. In some examples, a joint 500 may be formed between one hollow tube conductor 200 and another hollow tube conductor 200, or between one litz wire 400 and another litz wire 400, instead of a hollow tube conductor 200 and a litz wire 400, as illustrated in FIG. 5.

In some examples, the hollow tube conductor 200 and litz wire 400 may be connected by tapping and/or threading, and/or otherwise configuring the lug 420 to receive a screw and/or bolt, so as to allow connection of a lug 420 to a lug 420, or lug 420 to pad 206 through the screw and/or bolt. Additionally, or alternatively, a threaded insert may be pressed into the hole 428 in a lug 420 to provide the threaded feature for a bolt, thus eliminating some of the hardware (e.g., the lock nut 504 and/or washer 506).

Mounting Surfaces.

Figure 6D:
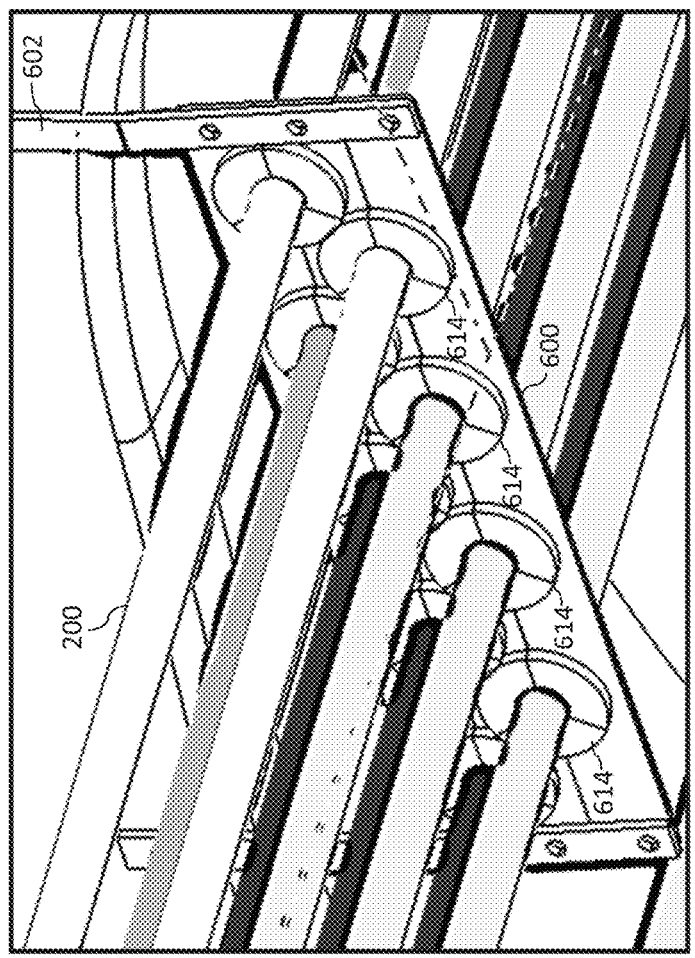
FIGS. 6a though 6e illustrate various examples of a mounting bracket to secure a plurality of hollow tube conductors in a parallel arrangement.
Figure 6C:
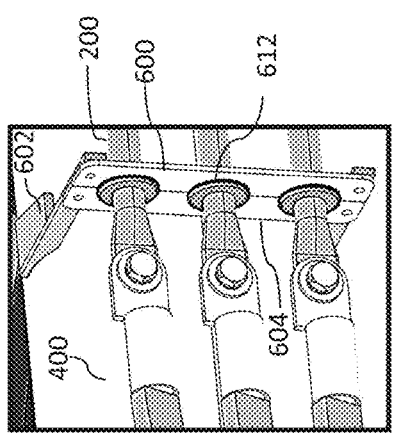

The PDS 100 may use one of several different mounting surfaces to retain the hollow tube conductors 200, litz wire 400, and associated joints 500 in the correct positions within the vehicle. FIGS. 6a through 6e illustrate mounting brackets 600, primarily for retaining hollow tube conductors 200. However, while the example shows the mounting brackets 600 retaining hollow tube conductors 200, in other examples the mounting brackets 600 may instead retain litz wire 400. The mounting brackets 600 may be configured for securing to some external surface, such as by hanging from a surface (as illustrated in FIG. 6d, for example), or attaching to a surface above, below, and/or to the side of the mounting brackets 600 (as illustrated in FIG. 6c and/or 6d, for example). One or more additional pieces 602 may be used to secure the mounting bracket 600 to an external surface. In some examples, the mounting bracket 600 may allow the hollow tube conductor 200 to slip or rotate axially but remain constrained radially. This permits thermal expansion of the conductor and allows small relative changes in length relative to the surrounding structure while maintaining required spacing between conductors.

The mounting bracket 600 includes several mounting plates 604 joined together. A middle mounting plate 604b includes U shaped (and/or semi-circle) channels 606 for the hollow tube conductors 200 to sit in and extend through. Therefore, the channels 606 are sized and shaped to correspond to the size and shape of the hollow tube conductors 200 (or portion thereof). The channels 606 can be cut into the top edge 608 and bottom edge 610 of the middle mounting plate 604b. The channels 606 are spaced apart in order to prevent the hollow tube conductors 200 from coming into contact with one another. The channels 606 are also staggered, such that the channels 606 on the top edge 608 and bottom edge 610 are out of vertical alignment. This out of alignment staggering may reduce the mutual inductance and proximity effect between adjacent conductors while offering the most space efficient system. The channels 606 may also be sized to fit the hollow tube conductors 200 while still allowing axial slip and/or room for thermal expansion. In some examples, the channels 606 on the upper edge 608 and bottom edge 610 may be vertically aligned.

An upper mounting plate 604*a* and a lower mounting plate 604*c* are connected to the middle mounting plate 604*b*. The upper mounting plate 604*a* and lower mounting plate 604*c* have similar U shaped (and/or semi-circle) channels 606 on their top edge 608 and bottom edge 610, respectively, that align with the channels 606 of the middle mounting plate 604*b* when the upper mounting plate 604*a* and lower mounting plate 604*c* are connected to the middle mounting plate 604*b*. In an alternative example, the mounting bracket 600 may only include an upper mounting plate 604*a* and a lower mounting plate 604*c*, with no middle mounting plate 604*b*. In such an example, the channels of the upper mounting plate 604*a* and lower mounting plate 604*c* may be aligned. More or fewer channels 606 may be included in the mounting plates as necessary and/or desired. The size and/or shape of the mounting plates 604 may be altered as necessary and/or desired. In some examples, the mounting plates 604 may be made of a continuous-woven glass fabric laminate with an epoxy resin, such as Garolite. The mounting plates 604 may be electrically insulating as well. In some examples, the plates may be made from materials that are electrically insulating but thermally conductive to achieve better thermal management of the conductors passing through them.

Figure 6E:
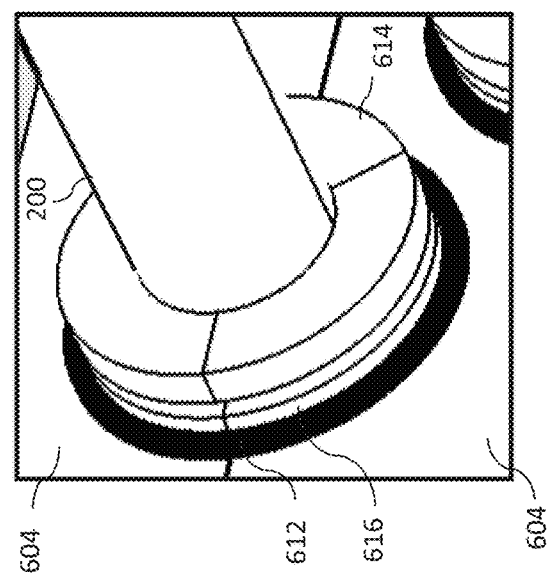

As illustrated in FIGS. 6*c* and 6*e*, for example, high temperature grommets 612 (e.g., Buna-N rubber) may be used to constrain and retain the hollow tube conductors 200 within the mounting bracket 600, while allowing for thermal expansion. The grommets 612 may be composed of silicone rubber and/or Buna-N rubber, for example. Additionally, or alternatively, a sleeve 614 may be used. The sleeve 614 may be composed of polytetrafluoroethylene (PTFE) (e.g., Teflon, available from DuPont). When used together, a snap ring 616 may be positioned between the grommet 612 and the PTFE sleeve 614 to secure the components relatively in place. The mounting arrangement allows for thermal expansion of the hollow tube conductors 200, as well as deformation in the surrounding structure and tolerance stack-up without excessively stressing the hollow tube conductors 200. The hollow tube conductors 200 may be able to slide in the PTFE sleeves 614 to accommodate axial growth, and the grommets 612 may help to allow for off-axis strain and/or growth. In operation, the high temperature grommets 612 retain the conductor, while still allowing some play radially and axial to account for thermal expansion or deformation due to loads (such as the wing moving in flight). The PTFE sleeves 614 also allows for some play radially and axial since it has lower friction.

FIGS. 7*a*-7*d* illustrate example bracket joints 700 that may be used to help secure a joint 500 connection between hollow tube conductors 200, litz wires 400, a hollow tube conductor 200 and a litz wire 400, and/or other conductive surfaces. In some examples, the bracket joint 700 comprises a flat surface 702 with connection apertures 704 (e.g., mounting holes) configured to align with the holes 208, 428 of the hollow tube conductor 200 and/or litz wires 400. The connection apertures 704 may employ single apertures (FIG. 7*a*) or paired apertures (FIG. 7*b*), depending on the configuration of the hollow tube conductor(s) 200 and/or litz wire(s) 400. In some examples, the bracket joint 700 may include a second surface 706 and a bend 708 coupling the first surface 702 with the second surface 706 (such as an L-beam). The second surface 706 may serve as a stabilizer and/or as a means of connecting the bracket joint 700 with another structure, such as a wall, a bulkhead, a frame, a beam, etc. In other examples, the bracket joint 700 may be connected with another structure via the second surface 706.

A joint 500 may be established coincident to the bracket joint 700 by aligning and connecting the connection apertures 704 of the bracket joint 700 with the corresponding holes 208, 428 in the hollow tube conductor(s) 200 and/or litz wire(s) 400. The connection may be established with fasteners 502, lock nuts 504, and washers 506, 508, 510 similar to the joint 500 connection arrangement described above.

FIGS. 8*a* and 8*b* illustrate a litz wire 400 mounting component 800. The mounting component 800 defines a slot 802 configured to allow multiple litz wires 400 to pass therethrough. The slot 802 may be made larger or smaller depending on the necessary and/or desired amount of litz wires 400 to pass through. Zip tie cable mounts 806 help to mechanically couple the litz wires 400 to the mounting component 800. The mounting component 800 may include a cooling vent 804 to allow ambient and/or driven air to pass through and help cool the litz wires 400 and/or other components. The mounting component 800 may also include one or more holes and/or protrusions for connecting the mounting component with another surface, such as a wall, floor, bulkhead, partition, rib, additional piece 602 etc.

Operation.

In operation, the PDS 100 conducts electrical signals to and from electrical devices in a vehicle, such as a ground vehicle, an aerial vehicle, an aquatic vehicle, a space vehicle, and/or other vehicles and/or structures. One or more hollow tube conductors 200 and litz wires 400 are used to establish an electrically conductive path between the electrical devices. In particular, rigid hollow tube conductors 200 are used to conduct electrical power through rigid portions of the vehicle and/or structure. The hollow tube conductors 200 may be periodically secured to the vehicle and/or structure using the mounting bracket 600 described above. Hollow tube conductors 200 may be coupled to other hollow tube conductors 200 as needed, either in free space or using the bracket joint 700 described above. Where smaller and/or flexible means of electrical conduction may be more convenient, the rigid hollow tube conductors 200 may be coupled to the more flexible litz wires 400 via the flat pad 206 of the hollow tube conductor 200 and the lug 420 of the litz wire 400. The coupling may be established using a bracket joint 700 or may be a hanging joint 500 in free space. The litz wires 400 may continue to establish the electrically conductive pathway. The litz wires 400 may be secured to the vehicle and/or structure using mounting components 800, as needed. Thereafter, the litz wires may be coupled back to the hollow tube conductors 200 to continue the electrically conductive pathway, or may be coupled to an electrical device at an end of the electrically conductive pathway.

Aircraft Example.

By way of illustration and without limitation, a PDS 100, in some examples, may be installed in an aircraft 900, such as a vertical take-off and landing (VTOL) hybrid propulsion aircraft 900 with ducted fans. In such an example, the PDS 100 may be configured to transition through the fuselage and wing/canard pivots into and along the wing/canards and into each ducted unit; thereby supplying power from the generator in the fuselage to each of the distributed electric motors. The PDS 100 may be further configured to account for and alleviate concerns related to arcing and coronal discharge between conductors, phase sets, and other conductive components. In some examples, the PDS 100 is configured to distribute power from 3 generators to 6 canard motors and 18 wing motors. In such an aircraft, the motor input powers (reported shaft power/motor efficiency) may be substantial (e.g., kilowatts to megawatts). The PDS 100 may be further configured to carry current at various frequencies. The PDS 100 may be further configured to utilize tubular conductors 200 for rigid sections and litz wire 400 where flexibility is needed. The PDS 100 may be further configured to implement a passive cooling solution that works across all flight regimes and altitudes. The PDS 100 may be architectured in a manner that distributes failure of a single generator distribution in a balanced fashion across the aircraft. The PDS 100 is further configured to implement circuit protection that alleviates failure of a single branch/motor from affecting other branches/motors or the generator. The PDS 100 is further designed to distribute the current associated with the canard and wing motors at both continuous and peak cases at defined voltage. The PDS 100 is further designed to reduce EMI/EMF (electromagnetic interference/electromotive force) between phase sets and other components.

Figure 9A:
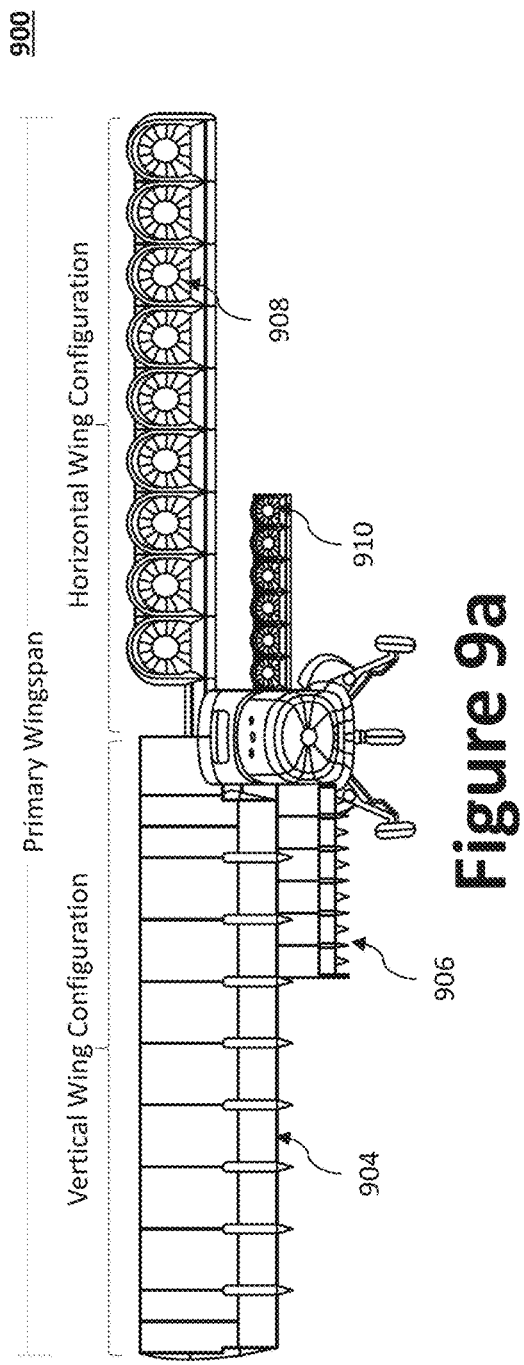
FIG. 9a illustrates a front view of an example aircraft.
Figure 9B:
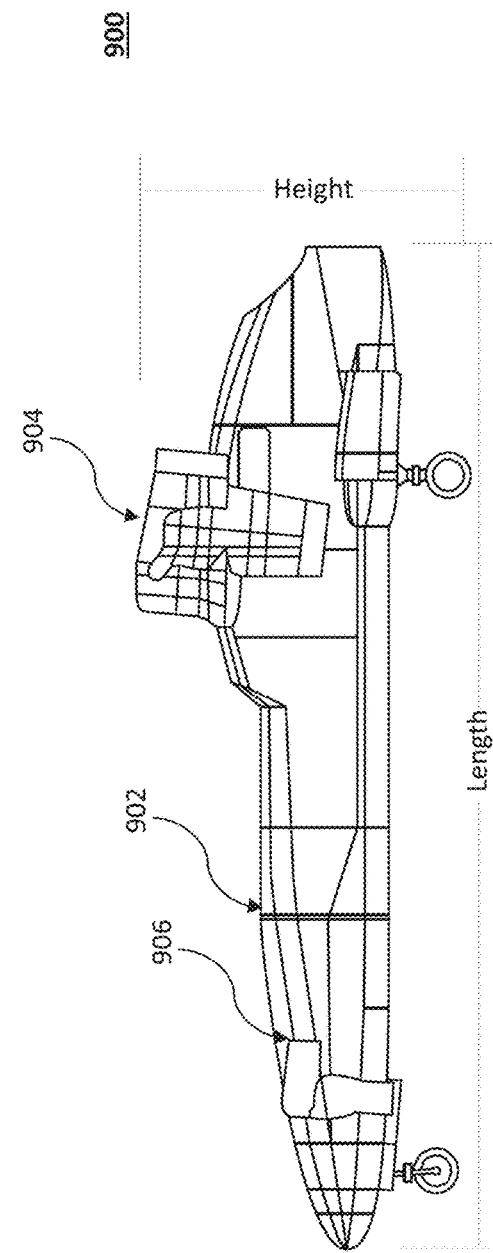

FIGS. 9a and 9b illustrate an example aircraft 900 according to an aspect of the present disclosure. The example aircraft 900 is a vertical take-off and landing (VTOL) hybrid propulsion aircraft 900. The hybrid propulsion aircraft 900 generates propulsion using a plurality of independently controllable alternating current (AC) motor-driven ducted fans, which receive AC power from one or more turbine-driven generators, for example, as illustrated herein, three generators. The aircraft 900 may be unmanned and fully autonomous (i.e., requiring no remote control pilot), unmanned and partially autonomous (i.e., requiring some remote control), and/or a cockpit may be added to enable manned operation. The aircraft 900 may be remotely controlled over a wireless communication link by a human operator, a computer operator (e.g., remote autopilot), and/or a remote base station. The aircraft 900 may also be configured to accommodate passengers. For instance, a passenger cabin may be inserted in the fuselage 902 between the primary wings 904 and canard wings 906 to carry passengers. While the example aircraft is a VTOL hybrid propulsion aircraft 900, persons of ordinary skill will recognize that the present disclosure may be applicable to many different type of aircraft.

As best illustrated in FIGS. 9a and 9b, a primary wing 904 and a canard wing 906 are positioned on each side of the fuselage 902. The two primary wings 904, defining a primary wing set, and two canard wings 906, defining a canard wing set, are pivotally mounted to the hybrid propulsion aircraft's 900 airframe (e.g., at the topside of the fuselage 902) to provide tilt-wing functionality. For instance, the fuselage 902 may comprise a plurality of actuator-controlled pivotal connectors that selectively pivot the primary and canard wings 904, 906 responsive to signals from the flight controller.

Figure 10B:
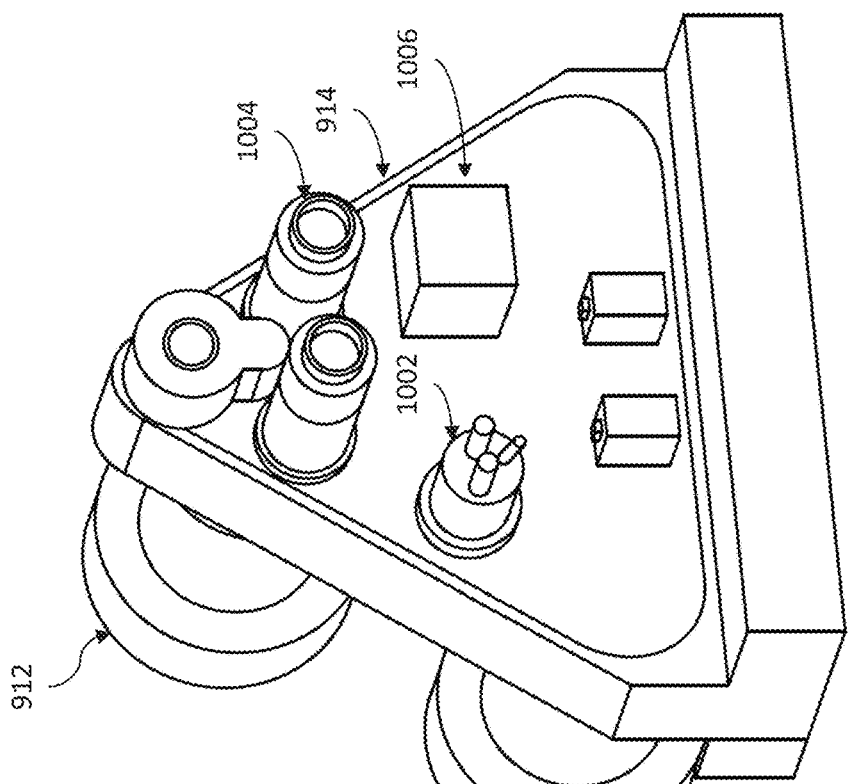
FIGS. 10a and 10b illustrate, respectively, front and rear isometric views of an example gearbox.
Figure 10A:
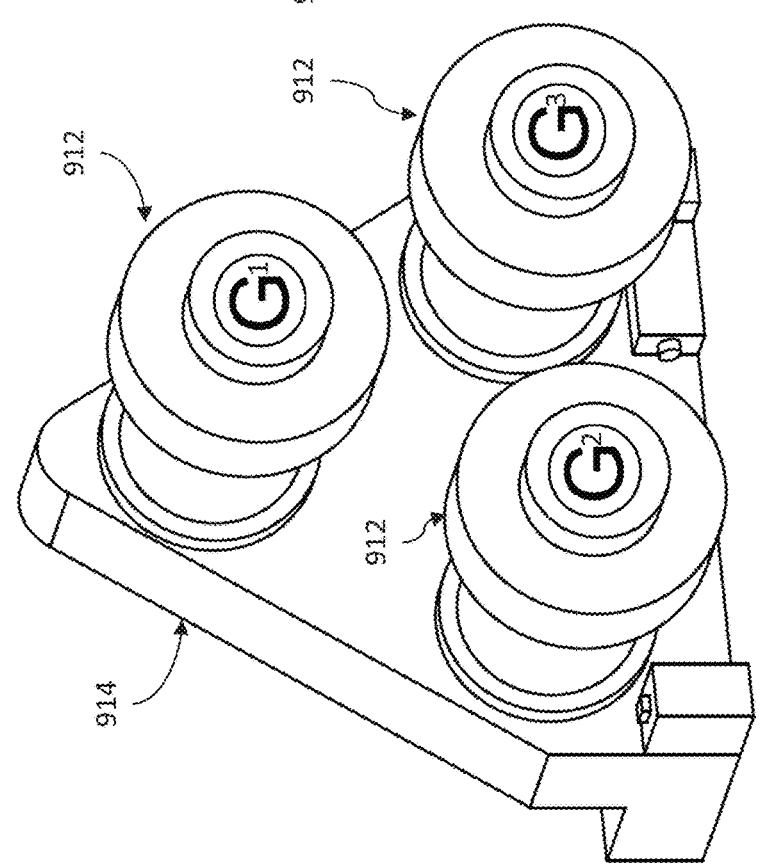

The aircraft's 900 distributed electric propulsion system generally comprises an engine, a gearbox 914, one or more primary generators 912, and a plurality of ducted fans, each of said plurality of ducted fans being driven by an electric motor. The plurality of ducted fans may include a plurality of primary ducted fans 908 positioned on the primary wings 904 and a plurality of canard ducted fans 910 positioned on the canard wings 906. The engine may be configured to drive the one or more primary generators 912 via the gearbox 914, such as shown, for example, in FIGS. 10a and 10b. Suitable engines include, for example, turbo shaft and turbine engines. A turbo shaft engine refers to a gas turbine engine that is optimized to produce shaft power, rather than jet thrust. The engine may be mounted to, for example, a first bulkhead, while the gearbox 914 mounted to a second bulkhead. Accordingly, the gearbox 914 may be coupled with a plurality of generators, including one or more primary generators 912 (e.g., 1 to 5 generators, more preferably 3 generators) and/or one or more auxiliary power generators 1004, which may power onboard accessories or systems. The gearbox 914 may be further configured to drive other devices, such as a hydraulic pump 1002, an oil pump 1006, etc.

The PDS 100 provides an electrically conductive path for electrical power between the components of the distributed electric propulsion system. In general, the PDS 100 is coupled to and conducts electrical power between the generators 912 (and/or any auxiliary generators 1004), the wing ducted fans 908, the canard ducted fans 910, and their corresponding electrical motors. The PDS 100 may also be coupled to (and conduct electrical power to/from) a plurality of residual current circuit breakers (RRCB) 1100 associated with the distributed electrical propulsion system. The PDS 100 may also provide electrically conductive pathways to/from other electronics (e.g., peripheral avionics, flight controllers, control surface actuators, lights, sensors, etc.) and/or other onboard systems or devices.

The PDS 100 is coupled to generators 912 in the fuselage 902. More particularly, electrical contacts on the generators 912 are coupled to litz wire 400 through the lugs 420 of the litz wire 400. Each generator 912 may have electrically conductive protrusions that jut out from the generator 912. The protrusions may be cylindrical and/or otherwise sized to fit the holes 428 on the lugs 420 of the litz wires 400, so as to electrically couple the generator 912 to the litz wires 400. In some examples, the generators 912 may have apertures that may be aligned with the holes 428 in the lugs 420 of the litz wires 400 and coupled together with fasteners, lock nuts, and washers, similar to the joints outlined above.

Each generator 912 may be coupled to a plurality of litz wires 400. The litz wires 400 are then routed to joints 500 where they are coupled to hollow tube conductors 200 in the fashion outlined above. One or more litz wires 400 may be coupled to each hollow tube conductor 200. The hollow tube conductors 200 may be retained in mounting brackets 600 near the generators 912. The mounting brackets 600 may be attached to one or more generators 912, to bulkheads, and/or to other structures in the fuselage 902. Through holes in the mounting brackets 600 may further provide a passageway through walls and/or bulkheads proximal to the generators 912. The hollow tube conductors 200 provide an electrically conductive pathway from the generators 912 in the fuselage 902 to electrical devices in other parts of the aircraft 900.

The hollow tube conductors 200 may provide an electrically conductive pathway from the joints proximal the generators 912 to canard circuit breakers 1100 corresponding to the canard ducted fans 910. In some examples, the canard circuit breakers 1100 may be positioned in a forward portion of the fuselage 902, near the canard wings 906. In alternative examples, the canard circuit breakers 1100 may be positioned in the canard wings 906 or in a different portion of the aircraft 900. The hollow tube conductors 200 may be routed through mounting brackets 600, walls, bulkheads, and other appropriate retaining surfaces. In some examples, the hollow tube conductors 200 are routed generally parallel to one another. Once near the canard circuit breakers 1100, the hollow tube conductors 200 are coupled to litz wires 400 at a bracket joint 700, such as described above. In alternative examples, the hollow tube conductors 200 may be coupled to litz wires 400 using floating joints 500. The litz wires 400 thereafter provide an electrically conductive pathway from the joint interface to the canard circuit breakers 1100. In some examples, the canard circuit breakers 1100 are mounted to the deck of the fuselage 902 with bonded and/or threaded studs, and/or nut plates. The litz wires 400 are electrically coupled to input terminals of the canard circuit breakers 1100. Litz wires 400 are also electrically coupled to output terminals of the circuit breakers 1100 and routed towards the canard ducted fans 910.

The PDS 100 may also provide an electrically conductive pathway from the joints 500 proximal the generators 912 to primary wing circuit breakers 1100 corresponding to the primary wing ducted fans 908. In some examples, the primary wing circuit breakers 1100 may be positioned in the fuselage 902, near the primary wings 904. In some examples, the primary wing circuit breakers 1100 are positioned in the primary wings 904 themselves. Hollow tube conductors 200 may provide an electrically conductive pathway from a point near the generators 912 to a point in the fuselage 902 near the primary wings 904. The hollow tube conductors 200 may then be coupled to flexible litz wire 400 at floating joints 500 before being routed into the primary wings 904.

Figure 11A:
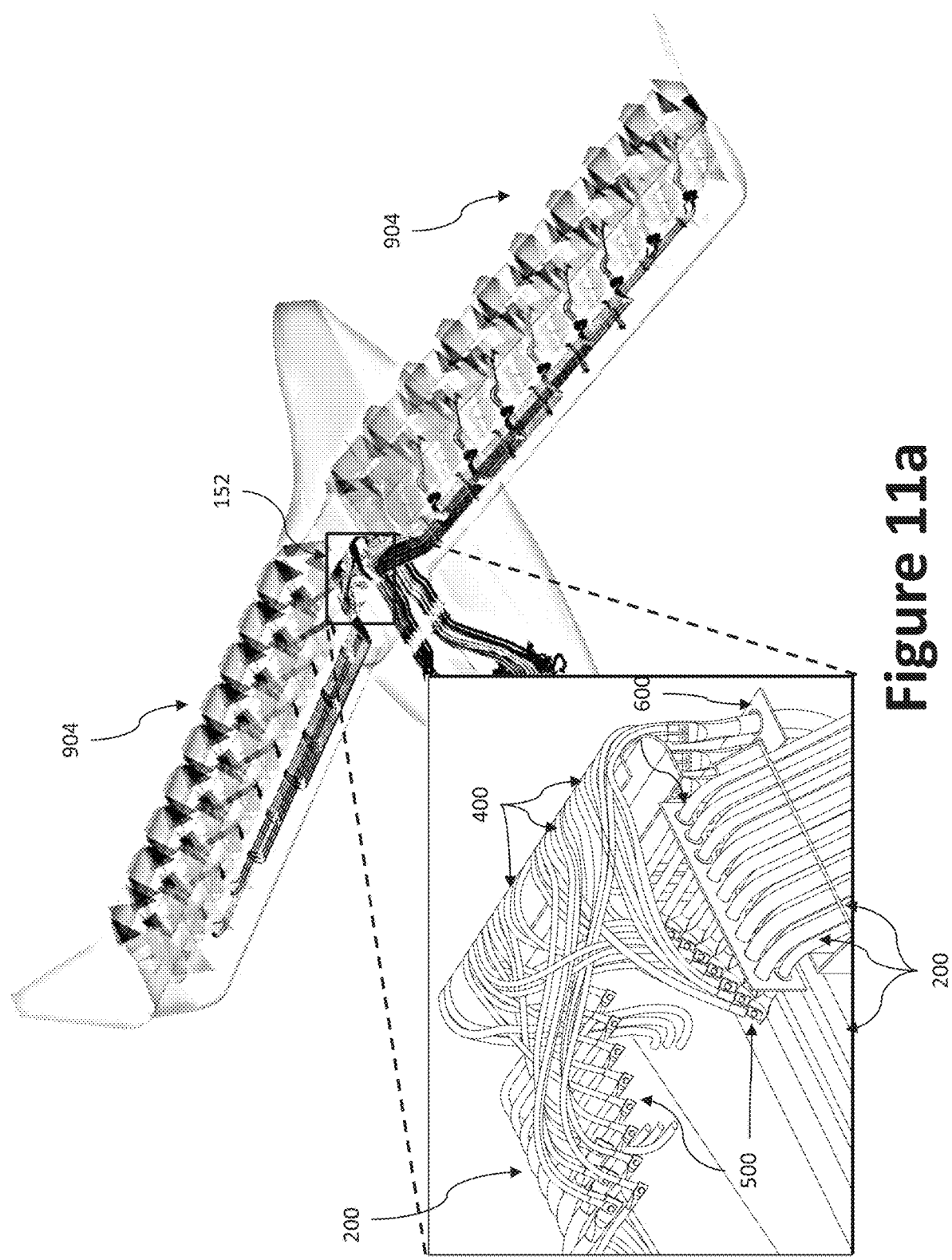
FIGS. 11a and 11b illustrate a flexible joint for power distribution across a primary wing pivot.
Figure 11B:
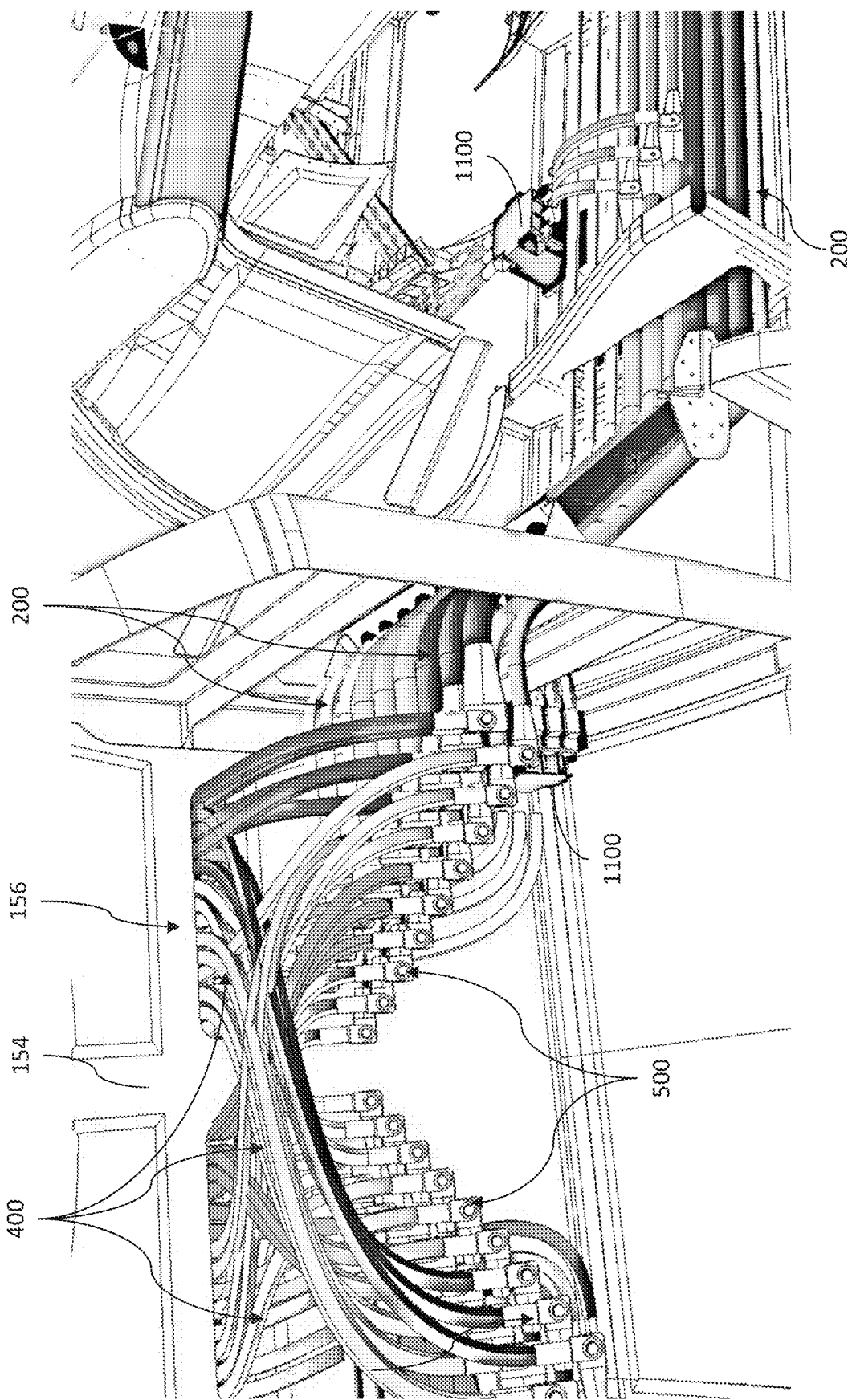

As shown, for example, in FIGS. 11a through 11c, litz wire 400 may be used to provide an electrically conductive pathway from components in the fuselage 902 to components in the primary wings 904 through a pivoting portion 152 of the primary wings 904. Because the pivoting portion 152 of the primary wings 904 is configured to be movable, the flexibility and smaller cross section of the litz wire 400 makes it more suitable for providing an electrically conductive pathway through the pivoting portion. Routing the PDS 100 conductors through the primary wing pivoting portion 152 minimizes conductor sweep, thereby mitigating risk of damage to the electrical conductors, such as the hollow tube conductors 200 and/or the litz wires 400. A bulkhead 154 proximate to the pivoting portion 152 of the primary wings 904 may have slots 156 for the litz wires 400 to pass through. Once through the pivoting portion 152, the litz wires 400 once again couple to hollow tube conductors 200 at floating joints 500. The hollow tube conductors 200 provide an electrically conductive pathway from the floating joints 500 at the exchange into the primary wing 904.

In certain aspects, one or more of the litz wires 400 may be coupled to electrical inputs of a primary wing circuit breaker 1100 rather than being coupled to the hollow tube conductors 200. The primary wing circuit breaker 1100 may be positioned in the fuselage 902 proximal to the pivoting portion 152. The primary wing circuit breaker 1100 may correspond to the first ducted fan (closest to the fuselage 902) in the primary wing 904. Corresponding litz wires 400 coupled to electrical outputs of the primary wing circuit breaker 1100 may be routed to the first ducted fan (closest to the fuselage 902) in the primary wing 904.

The primary wing 904 may be pivotally connected to the fuselage 902 using a plurality of pivotal connectors (not shown), which may be actuator-controlled. Suitable actuators include, without limitation, hydraulic actuators, electric actuators, or a hydraulic or electrically driven translating jackscrew. To the extent that electric actuators are used, the PDS 100 may provide an electrically conductive pathway for electrical power to reach the electrical actuators.

PDS 100 hollow tube conductors 200 egress from the fuselage 902 close to the primary wing pivot portion 150, between the mid-spar and forward spar. A conductor opening in the surface of the fuselage 902 (and/or upper rib closest to the fuselage 902) may provide a passage for the hollow tube conductors 200 to travel between the fuselage 902 and primary wing 904. A mounting bracket 600 attached to a wing tilt rib 170 retains the hollow tube conductors 200 as they travel from the fuselage 902 to the primary wing 904. In some examples, the mounting bracket 600 may be attached to the upper rib closest to the fuselage 902. In some examples, the wing tilt rib 170 and the upper rib closest to the fuselage 902 may be one and same. Mounting holes may be added to the wing tilt rib to accommodate the connection of the mounting bracket(s) to the wing tilt rib 170.

Once within the primary wing 904, the hollow tube conductors 200 provide an electrically conductive pathway through the primary wing 904. As illustrated in FIG. 12, at least one of the hollow tube conductors 200 may extend across substantially the entire span of the primary wing 904 (or canard wing 906, as the case may be). In some examples, the hollow tube conductors are routed along a bottom surface skin of the primary wing 904. In some examples, the hollow tube conductors 200 may be positioned near to, and extend substantially parallel to, a leading edge of the primary wing 904, between the mid-spar and forward spar. In other examples, the hollow tube conductors 200 may be positioned closer to a middle of the wing and/or a trailing edge of the primary wing 904, between the mid-spar and lower aft spar. In some examples, the hollow tube conductors 200 are routed through openings in the forward ribs. In alternative examples, the hollow tube conductors 200 may be routed through the aft ribs and/or the upper ribs. Mounting brackets 600 retain the hollow tube conductors 200 as they travel through the primary wing 904.

In some examples, the mounting brackets 600 are connected to the forward ribs. Additionally, or alternatively, the mounting brackets 600 may be connected to the forward spar and/or mid-spar. Cooling windows 180 may be included in the forward ribs to encourage airflow along the electrically conductive pathway of the PDS 100 within the primary wing 904. In some examples, multiple cooling windows 180 are included in each forward rib. For instance, as illustrated in FIG. 12b, there may be an upper cooling window 180a and a lower cooling window 180b. The lower cooling window 180 may be approximately the same size as the mounting bracket 600. The mounting bracket 600 may be connected to the forward rib parallel to the lower cooling window 180b, and off axis from the forward rib, such that there is a gap 182 between the forward rib and the mounting bracket 600 where air can flow. More particularly, the gap 182 may be between the lower cooling window 180b and the mounting bracket 600, such that air can flow through the lower cooling window 180 and around the mounting bracket 600 through the gap 182. In some examples, (such as closer to the wing tip, where fewer hollow tube conductors 200 remain) the mounting bracket 600 may be smaller than the lower cooling window 180, and so may be positioned within the lower cooling window 180b itself, as the small size of the mounting bracket 600 makes the impediment to air flow negligible. Holes may be added to the forward ribs to assist with attachment of the mounting bracket 600. Additional air may flow through the upper cooling window 180 to assist in cooling the PDS 100.

At each duct chamber one or more conductors split off from the main array of hollow tube conductors 200. More particularly, one or more hollow tube conductors 200 connect with litz wire 400 at a floating joint 500. In alternative examples, the joint may be a bracket joint 700. In either case, the litz wire 400 connects with the hollow tube conductors 200 and is then routed to one or more inputs of the primary wing circuit breaker 1100 corresponding to that particular duct chamber. Litz wire 400 also connects with outputs of the primary wing circuit breaker 1100. The litz wire 400 that connects to the outputs of the primary wing circuit breaker 1100 are routed to the fan motor and/or aero stator of the thrust assemblies for that particular duct chamber. The litz wire 400 may be routed through any bulkheads, walls, ribs, and/or other structures necessary, using methods discussed above. This splitting off of litz wire 400 from the main array of hollow tube conductors 200 happens in each duct chamber along the span of the primary wing 904. As the primary wing 904 progresses from root to tip (from fuselage to wingtip), fewer and fewer hollow tube conductors 200 exist to provide an electrically conductive pathway down the span of the wing. Finally, at the last duct chamber, the last hollow tube conductors 200 are coupled to litz wires 400 at a joint 500. The litz wires 400 are then routed to the primary wing circuit breaker 1100 for that last duct chamber, and then, from the primary wing circuit breaker 1100, to the fan motor and/or aero stator for the final duct chamber.

In some examples, the arrangement of the PDS 100 with respect to the canard wings 906 is slightly different than with respect to the primary wings 904. For one, the canard circuit breakers 1100 may be positioned in the fuselage 902, rather than the canard wings 906. Litz wires 400 that are coupled to the outputs of the canard circuit breakers 1100 are secured to the forward tube spar, such that litz wires 400 may rotate along with the canard wing 906. Spacer supports may be used to secure the litz wires 400 to the forward tube spars. Thermal spacers may be used to separate groups of litz wires 400 for cooling purposes. The litz wires 400 near the pivoting portion of the canard wings 906 may be arranged in service loops, which contract and expand in diameter as the forward tube spar rotates. Such service loops mitigate kinking while preventing loose or unfastened litz wire 400 cabling. Service loops may be positioned on each side of the forward tube spar.

Litz wires 400 may be routed from the fuselage 902 into the canard wings 906 along the forward tube spar and then to the fan motors and/or aero stators of the thrust assemblies. As there are only fewer duct chambers in each canard wing 906 (compared to the primary wing 904), it may be unnecessary to couple the litz wires 400 to hollow tube conductors 200 for routing along the canard wing 906. In some examples, only the set of litz wires 400 coupled to the canard circuit breakers 1100 for the farthest duct chamber are coupled to a set of hollow tube conductors 200 for routing to the final and farthest duct chamber, nearest the canard wing 906 tip. The coupling may be via a free space joint 500 and/or a bracket joint 700. The hollow tube conductors may be routed along the forward tube spar and through ribs that form part of the separators between each duct chamber. Mounting brackets 600 may retain the hollow tube conductors 200 as they are routed along the canard wing 906. The mounting brackets 600 may be secured to the forward spar and/or to the ribs. In some examples, a hollow tube is installed substantially adjacent to the forward tube spar, and the hollow tube conductors 200 are routed through the hollow tube. Once the hollow tube conductors 200 near the final duct chamber, they may be coupled to litz wires 400 at a joint 500. The litz wires 400 are ultimately routed to the fan motors and/or aero stators of the thrust assemblies in their respective duct chambers through any bulkheads, walls, ribs, and/or other structures necessary, using methods discussed above.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A power distribution system for distributing electrical power along an electrically conductive pathway, the power distribution system comprising:
   an electrical conductor having a hollow interior core defined by an outer shell, the outer shell having a thickness determined as a function of a skin effect or a proximity effect, wherein the electrical conductor is flattened at an end to seal the hollow interior core at the end;
   an electrically conductive cable; and
   an electrical coupler to couple the electrical conductor to the electrically conductive cable electrically, thereby defining an electrically conductive pathway between the electrical conductor and the electrically conductive cable.

2. The power distribution system of claim 1, wherein the electrical conductor is substantially rigid such that its orientation and position is fixed.

3. The power distribution system of claim 1, wherein the electrically conductive cable comprises an end having an integral lug crimped to an exposed portion of the electrically conductive cable.

4. The power distribution system of claim 1, wherein the electrically conductive cable comprises a litz wire.

5. The power distribution system of claim 4, wherein the litz wire comprises an aluminum conductor, a copper conductor, or a composite fiber conductor.

6. The power distribution system of claim 3, wherein the electrical conductor is flattened at the end to define a flat pad.

7. The power distribution system of claim 6, wherein the electrical coupler is electrically conductive and extends through a hole in the flat pad and a hole in the integral lug to couple the electrical conductor to the electrically conductive cable.

8. The power distribution system of claim 1, wherein the electrically conductive pathway is configured to conduct electrical power between a plurality of electrical devices.

9. The power distribution system of claim 8, wherein the plurality of electrical devices comprises a power source and a motor.

10. The power distribution system of claim 1, wherein the electrical conductor comprises a vent hole to vent the hollow interior core.

11. A power distribution system for distributing electrical power along an electrically conductive pathway, the power distribution system comprising:
    an electrical conductor having an outer shell shaped to define a hollow interior core, wherein the outer shell is flattened at one end to define a flat pad;
    an electrically conductive cable; and an electrical coupler configured to couple the electrically conductive cable electrically to the flat pad of the electrical conductor to provide an electrically conductive pathway between the electrical conductor and the electrically conductive cable.

12. The power distribution system of claim 11, wherein the electrical conductor comprises a vent hole configured to vent the hollow interior core.

13. The power distribution system of claim 11, wherein the outer shell defines a circular cross-section.

14. The power distribution system of claim 11, wherein the electrical conductor is rigid and the electrically conductive cable is flexible.

15. The power distribution system of claim 11, wherein the electrically conductive cable comprises a litz wire.

16. The power distribution system of claim 11, wherein the electrical coupler is configured to couple the electrically conductive cable to the flat pad of the electrical conductor via an integral lug crimped to an exposed portion of the electrically conductive cable.

17. The power distribution system of claim 11, wherein the outer shell has a thickness determined as a function of a skin effect or a proximity effect.

18. A power distribution system for distributing electrical power along an electrically conductive pathway, the power distribution system comprising:
   an electrical conductor having an outer shell shaped to define a hollow interior core with a circular cross section, wherein the outer shell is flattened at one end to define a flat pad; and
   an electrical coupler configured to couple with the flat pad and to provide an electrically conductive pathway between the electrical conductor and a second electrical conductor or a cable.

19. The power distribution system of claim 18, wherein the flat pad comprises a hole configured to receive the electrical coupler.

20. The power distribution system of claim 18, wherein the electrical conductor comprises a vent hole configured to vent the hollow interior core.

* * * * *